US012754784B2

(12) United States Patent
Wang et al.

(10) Patent No.: US 12,754,784 B2
(45) Date of Patent: Oct. 6, 2026

(54) PROVIDING AND USING AN ACTIVITY LOGGING SERVICE

(71) Applicant: AT&T Intellectual Property I, L.P., Atlanta, GA (US)

(72) Inventors: Wei Wang, Harrison, NJ (US); Lars Johnson, Brooklyn, NY (US)

(73) Assignee: AT&T Intellectual Property I, L.P., Atlanta, GA (US)

( * ) Notice: Subject to any disclaimer, the term of this patent is extended or adjusted under 35 U.S.C. 154(b) by 518 days.

(21) Appl. No.: 17/899,747

(22) Filed: Aug. 31, 2022

(65) Prior Publication Data

US 2024/0069986 A1 Feb. 29, 2024

(51) Int. Cl.
*G06F 9/54* (2006.01)

(52) U.S. Cl.
CPC .................................... *G06F 9/542* (2013.01)

(58) Field of Classification Search
CPC ....................................................... G06F 9/542
See application file for complete search history.

(56) References Cited

U.S. PATENT DOCUMENTS 9,460,177 B1 * 10/2016 Pawar ................. G06F 16/1865
10,924,496 B1 * 2/2021 Gu ........................ H04L 63/107
11,587,074 B2 * 2/2023 Snow ..................... H04L 9/3236
2008/0222186 A1 * 9/2008 Cozianu .............. G06F 11/0748 707/999.102
2013/0254372 A1 * 9/2013 Pierce ................... G06F 21/445 709/224
2015/0220814 A1 * 8/2015 Verkasalo .......... G06Q 20/3255 382/103
2015/0301921 A1 * 10/2015 Kumar ................ G06F 11/3072 714/38.1
2015/0370618 A1 * 12/2015 Yaary ............... G06Q 10/06314 719/318
2018/0184464 A1 * 6/2018 Fang ..................... H04W 76/14
2018/0287797 A1 * 10/2018 Banerjee ............... H04L 9/3263

(Continued)

OTHER PUBLICATIONS

Jamil et al., "Towards Secure Fitness Framework Based on IoT-Enabled Blockchain Network Integrated with Machine Learning Algorithms", Feb. 26, 2021, Sensors 2021, pp. 1-31 (Year: 2021).*

(Continued)

*Primary Examiner* — Kevin L Young
*Assistant Examiner* — Jennifer Marie Gutman
(74) *Attorney, Agent, or Firm* — Guntin & Gust, PLC; Andrew Gust

(57) ABSTRACT

Providing and using an activity logging service can include registering an activity logging service with a hash ledger storage service that can store a hash ledger that represents an activity log for an entity, and registering an observer device with the activity logging service. The observer device can provide event data to the activity logging service, and the event data can describe an event associated with the entity. The event data can be obtained from the observer device and a block that represents the event can be generated. A block can be added to the activity log, and a hash of a portion of the activity log can be generated and sent to the hash ledger storage service. The hash ledger storage service can be configured to append the hash of the portion of the activity log to the hash ledger that represents the activity log for the entity.

20 Claims, 11 Drawing Sheets

(56) References Cited

U.S. PATENT DOCUMENTS

| | | | | |
|---|---|---|---|---|
| 2019/0306024 | A1* | 10/2019 | Petria | H04W 4/38 |
| 2019/0319808 | A1* | 10/2019 | Fallah | H04L 9/3239 |
| 2019/0324649 | A1* | 10/2019 | Rodgers | G06F 9/544 |
| 2020/0019450 | A1* | 1/2020 | Patton | G06F 21/64 |
| 2020/0034454 | A1* | 1/2020 | Chamarajnager | H04L 9/0637 |
| 2020/0075056 | A1* | 3/2020 | Yang | G11B 20/10527 |
| 2020/0099727 | A1* | 3/2020 | Dice | H04L 65/1069 |
| 2020/0155944 | A1* | 5/2020 | Witchey | H04L 9/3239 |
| 2020/0162260 | A1* | 5/2020 | Boneti | H04L 67/10 |
| 2020/0212932 | A1* | 7/2020 | Bier | H04L 9/0637 |
| 2022/0014377 | A1* | 1/2022 | Vasudevan | G06F 21/64 |
| 2022/0182446 | A1* | 6/2022 | Sittisombut | H04L 67/1001 |
| 2022/0303186 | A1* | 9/2022 | Marshall | H04L 41/0681 |
| 2023/0048477 | A1* | 2/2023 | Dorris, Jr. | A63F 13/335 |
| 2023/0195544 | A1* | 6/2023 | R | G06F 9/542<br>719/318 |

OTHER PUBLICATIONS

Brogan et al. "Authenticating Health Activity Data Using Distributed Ledger Technologies", Jul. 17, 2018, Computational and Structural Biotechnology Journal, pp. 257-266 (Year: 2018).*

* cited by examiner

PROVIDING AND USING AN ACTIVITY LOGGING SERVICE

BACKGROUND

A person may under certain circumstances need to prove or disprove their location, activity, or the like at some point in time. Providing evidence of such location, activity, or the like may be difficult. Electronic devices may be used to prove or disprove alleged activities of people at some times and/or under certain circumstances. For example, crime investigators may assume the presence of a person at a particular place based on cell phone records or the like. In some instances, the lack of electronic data may prove, disprove, fail to prove, and/or fail to disprove that a person was or was not at a particular place at a particular time.

SUMMARY

The present disclosure is directed to providing and using an activity logging service. A computing device such as a manager device can be configured to host and/or execute an activity logging service. The activity logging service can be configured to interface with one or more observer devices to capture events and/or activities associated with an entity such as a user, a device, or the like. The functionality of the activity logging service can be configured, in some embodiments, via interactions between a user device and the activity logging service. In various embodiments, the user device can execute a module or application such as, for example, a manager application to interact with the activity logging service to configure the functionality of the activity logging service. Because other devices can be configured to interact with and/or control the activity logging service, it should be understood that this example is illustrative, and therefore should not be construed as being limiting in any way.

According to various embodiments of the concepts and technologies disclosed herein, one or more observer devices can be identified and/or registered with the activity logging service to capture events occurring in proximity to the manager device and/or the observer devices. According to various embodiments of the concepts and technologies disclosed herein, the activity logging service also can be registered with the hash ledger storage service. It can be appreciated that the hash ledger storage service can provide backup and verification functionality for activity logs created by the activity logging service in some embodiments. The hash ledger can correspond to a hashed and secure version of the activity log in some embodiments. Thus, if a secure record of activity associated with an entity is needed or desired (e.g., for corroboration or the like), the hash ledger can be used to verify activity in a secure manner as the hash ledger cannot be modified without detection. It should be understood that this example is illustrative, and therefore should not be construed as being limiting in any way.

According to various embodiments, the observer devices can detect one or more events associated with one or more entities and generate, based on the events detected, event data that represents the detected events. The observer device can provide the event data to the activity logging service. The activity logging service can generate one or more blocks that can represent the events and add the blocks to the activity log. Thus, the activity log can be updated to reflect the events detected by the observer devices. The activity logging service can generate a hash of the activity log and/or the block of the activity log (and optionally a previous block and/or metadata or other information). The activity logging service can provide the hash to a hash ledger storage service, and the hash ledger storage service can append the hash to the hash ledger. The hash ledger can provide a verifiable and authenticatable version of the activity log. It should be understood that this example is illustrative, and therefore should not be construed as being limiting in any way.

According to one aspect of the concepts and technologies disclosed herein, a system is disclosed. The system can include a processor and a memory. The memory can store computer-executable instructions that, when executed by the processor, cause the processor to perform operations. The operations can include registering an activity logging service with and a hash ledger storage service that can be configured to store a hash ledger that represents an activity log for an entity, and registering an observer device with the activity logging service. The observer device can be configured to provide event data to the activity logging service, and the event data can describe an event associated with the entity. The operations further can include obtaining, from the observer device, the event data, generating, based on the event data, a block that represents the event, adding the block to the activity log, generating a hash of a portion of the activity log, and sending the hash to the hash ledger storage service. The hash ledger storage service can be configured to append the hash of the portion of the activity log to the hash ledger that represents the activity log for the entity.

In some embodiments, the operations can further include initiating event logging via an interaction with a user device associated with the entity, where the interaction can occur via a portal provided by the activity logging service. In some embodiments, the portion of the activity log that is hashed can include the block. In some embodiments, the portion of the activity log that is hashed can include the block, a previous block that describes a previous event, and metadata that relates to the event and the previous event. In some embodiments, the event data can identify a time at which the event occurred, an identity associated with the event, a description of the event, and a location at which the event occurred. In some embodiments, the identity associated with the event can include an identity of the entity.

According to another aspect of the concepts and technologies disclosed herein, a method is disclosed. The method can include registering, by a computing device that can include a processor, an activity logging service with and a hash ledger storage service that is configured to store a hash ledger that represents an activity log for an entity; and registering, by the processor, an observer device with the activity logging service. The observer device can be configured to provide event data to the activity logging service, and the event data can describe an event associated with the entity. The method further can include obtaining, by the processor and from the observer device, the event data; generating, by the processor and based on the event data, a block that represents the event; adding, by the processor, the block to the activity log; generating, by the processor, a hash of a portion of the activity log; and sending, by the processor, the hash to the hash ledger storage service. The hash ledger storage service can append the hash of the portion of the activity log to the hash ledger that represents the activity log for the entity.

In some embodiments, the method further can include initiating event logging via an interaction with a user device associated with the entity. The interaction can occur via a portal that can be provided by the activity logging service. In some embodiments, the event data can identify a time at which the event occurred, an identity associated with the event, a description of the event, and a location at which the event occurred. In some embodiments, the method can further include obtaining, from a user device in communication with the activity logging service, settings that specify events to log using the activity logging service. The settings can be obtained via a user interface presented at the user device. In some embodiments, the observer device can include a camera, and the event can include a change in state associated with the entity. In some embodiments, the event can include a movement of the entity in proximity to the observer device. In some embodiments, the hash ledger can include a blockchain data structure that can represent the activity log.

According to yet another aspect of the concepts and technologies disclosed herein, a computer storage medium is disclosed. The computer storage medium can store computer-executable instructions that, when executed by a processor, cause the processor to perform operations. The operations can include registering an activity logging service with and a hash ledger storage service that can be configured to store a hash ledger that represents an activity log for an entity, and registering an observer device with the activity logging service. The observer device can be configured to provide event data to the activity logging service, and the event data can describe an event associated with the entity. The operations further can include obtaining, from the observer device, the event data, generating, based on the event data, a block that represents the event, adding the block to the activity log, generating a hash of a portion of the activity log, and sending the hash to the hash ledger storage service. The hash ledger storage service can be configured to append the hash of the portion of the activity log to the hash ledger that represents the activity log for the entity.

In some embodiments, the operations further can include initiating event logging via an interaction with a user device associated with the entity. The interaction can occur via a portal that can be provided by the activity logging service. In some embodiments, the event data can identify a time at which the event occurred, an identity associated with the event, a description of the event, and a location at which the event occurred. In some embodiments, the operations can further include obtaining, from a user device in communication with the activity logging service, settings that specify events to log using the activity logging service. The settings can be obtained via a user interface presented at the user device. In some embodiments, the observer device can include a camera, and the event can include a change in state associated with the entity. In some embodiments, the event can include a movement of the entity in proximity to the observer device. In some embodiments, the hash ledger can include a blockchain data structure that can represent the activity log.

Other systems, methods, and/or computer program products according to embodiments will be or become apparent to one with skill in the art upon review of the following drawings and detailed description. It is intended that all such additional systems, methods, and/or computer program products be included within this description and be within the scope of this disclosure.

DETAILED DESCRIPTION

Figure 1:
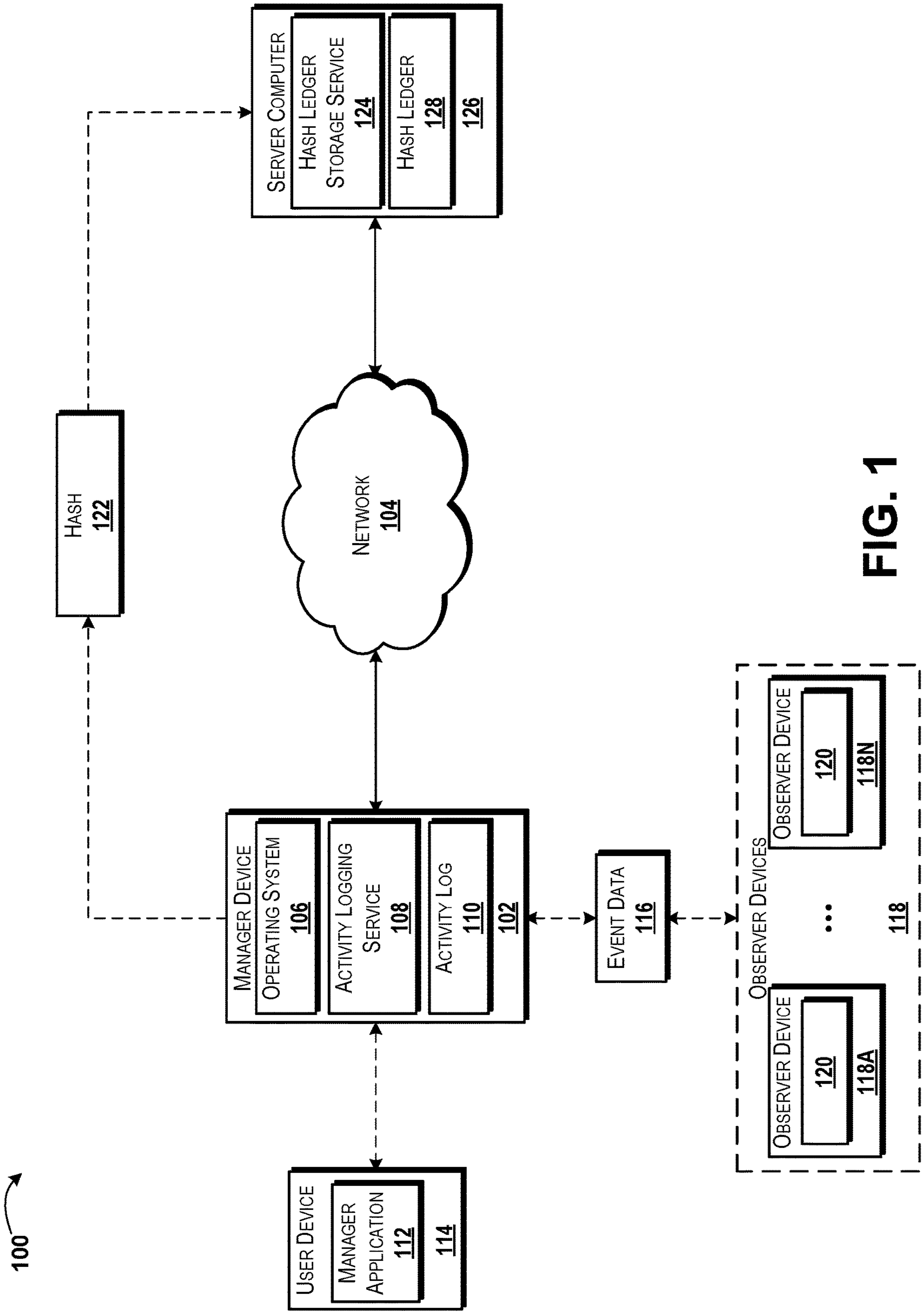
FIG. 1 is a system diagram illustrating an illustrative operating environment for various embodiments of the concepts and technologies described herein.

The following detailed description is directed to providing and using an activity logging service. A computing device such as a manager device can be configured to host and/or execute an activity logging service. The activity logging service can be configured to interface with one or more observer devices to capture events and/or activities associated with an entity. The functionality of the activity logging service can be configured, in some embodiments, via interactions between a user device and the activity logging service. In various embodiments, the user device can execute a manager application to interact with the activity logging service to configure the functionality of the activity logging service. Because other devices can be configured to interact with and/or control the activity logging service, it should be understood that this example is illustrative, and therefore should not be construed as being limiting in any way.

According to various embodiments of the concepts and technologies disclosed herein, one or more observer devices can be identified and/or registered with the activity logging service to capture events occurring in proximity to the manager device and/or the observer devices. According to various embodiments of the concepts and technologies disclosed herein, the activity logging service also can be registered with the hash ledger storage service. It can be appreciated that the hash ledger storage service can provide backup and verification functionality for the activity logging service. The hash ledger can correspond to a hashed and secure version of the activity log. Thus, if a secure record of activity associated with an entity is needed or desired, the hash ledger can be used to verify activity in a secure manner as the hash ledger cannot be modified without detection. It should be understood that this example is illustrative, and therefore should not be construed as being limiting in any way.

The observer devices can detect one or more events associated with one or more entities and generate, based on the events detected, event data that can represent the detected events. The observer device can provide the event data to the activity logging service. The activity logging service can generate one or more blocks that can represent the events and add the blocks to the activity log. Thus, the activity log can be updated to reflect the events detected by the observer devices. The activity logging service can generate a hash of the activity log and/or the block of the activity log (and optionally a previous block and/or metadata or other information). The activity logging service can provide the hash to a hash ledger storage service, and the hash ledger storage service can append the hash to the hash ledger. The hash ledger can provide a verifiable and authenticatable version of the activity log. It should be understood that this example is illustrative, and therefore should not be construed as being limiting in any way.

In various embodiments of the concepts and technologies disclosed herein, the manager device can be configured to use current and/or past event data to determine and/or estimate a likelihood of users being located at a particular location and/or being involved in a particular task at any time. In some embodiments, the manager device can use machine learning and/or artificial intelligence to analyze the event data (e.g., past and/or current event data) to make these and/or other determinations regarding an expected location and/or activity associated with a particular user. In some embodiments, the event data also can be used to identify conflicts or anomalies (e.g., a user located at a first location at a first time and the same user being located at a second location that is far away from the first location at a second time that seems unlikely and/or even impossible; a user being involved in two tasks at the same time and/or in close time proximity to one another that seems unlikely; a user being located at two locations at the same time; etc.). These and/or other anomalies or conflicts can be identified based on the event data in various embodiments. It should be understood that this example is illustrative, and therefore should not be construed as being limiting in any way.

While the subject matter described herein is presented in the general context of program modules that execute in conjunction with the execution of an operating system and application programs on a computer system, those skilled in the art will recognize that other implementations may be performed in combination with other types of program modules. Generally, program modules include routines, programs, components, data structures, and other types of structures that perform particular tasks or implement particular abstract data types. Moreover, those skilled in the art will appreciate that the subject matter described herein may be practiced with other computer system configurations, including hand-held devices, multiprocessor systems, microprocessor-based or programmable consumer electronics, minicomputers, mainframe computers, and the like.

Referring now to FIG. 1, aspects of an operating environment 100 for various embodiments of the concepts and technologies disclosed herein for providing and using an activity logging service will be described, according to an illustrative embodiment. The operating environment 100 shown in FIG. 1 includes a manager device 102. The manager device 102 can operate in communication with and/or as part of a communications network ("network") 104, though this is not necessarily the case in all embodiments.

According to various embodiments, the functionality of the manager device 102 may be provided by one or more server computers, desktop computers, mobile telephones, laptop computers, gateway devices, other computing systems, and the like. It should be understood that the functionality of the manager device 102 may be provided by a single device, by two or more similar devices, and/or by two or more dissimilar devices. For purposes of describing the concepts and technologies disclosed herein, the manager device 102 is described herein as a gateway device. It should be understood that this embodiment is illustrative, and should not be construed as being limiting in any way.

The manager device 102 can execute an operating system 106 and one or more application programs such as, for example, an activity logging service 108. The operating system 106 can include a computer program that can control the operation of the manager device 102. The activity logging service 108 can include an executable program that can be configured to execute on top of the operating system 106 to provide various functions as illustrated and described herein.

The activity logging service 108 can be configured to provide tracking and/or logging of activities and/or events associated with one or more users or other entities. Thus, for example, the activity logging service 108 can be configured to detect an event associated with an entity and to log that event in an activity log 110. The activity log 110 can include blocks or records for the one or more events. In some embodiments, the activity log 110 can correspond to a database and the blocks or records can correspond to tuples or records in the database. Thus, the activity log 110 can store one or more events associated with a particular entity (e.g., a user of the activity logging service 108) over time. In some embodiments of the concepts and technologies disclosed herein, the activity log 110 can be used to prove that the entity (e.g., the user) was located at a certain location performing a certain action or activity at a particular time in a verifiable and irrefutable form. As will be explained in more detail herein, the activity log 110 can be stored in some embodiments in one or more blockchain data structures and/or backups and/or hashes thereof for verification purposes. In some other embodiments, a hash or blockchain data structure can be created and/or saved as a backup of the activity log 110. It should be understood that this example is illustrative, and therefore should not be construed as being limiting in any way.

According to various implementations of the concepts and technologies disclosed herein, the activity logging service 108 can be interacted with by a user or other entity, for example using a manager application 112, which can be hosted and/or executed by a user device 114. The functionality of the user device 114 can be provided in various embodiments by a smartphone, a laptop computer, a personal computer, a tablet computer, or the like. Thus, it can be appreciated that the manager application 112 can correspond to a native application (native to the user device 114), a web-based application (e.g., provided by a website, portal, or API associated with the manager device 102), or other type of application in various embodiments of the concepts and technologies disclosed herein.

The user device 114 can interact with the manager device 102 to identify and/or scan for one or more observer devices 118A-N (hereinafter "observer devices 118"). The observer devices 118 can correspond to devices capable of detecting various events associated with a user or device. In some embodiments, for example, the observer devices 118 can include cameras, web-cams, video doorbell units, networking routers, cellular network hardware, combinations thereof, or the like. In various embodiments of the concepts and technologies disclosed herein, the observer devices 118 can execute one or more modules or applications (e.g., an event logging application 120), which can enable the observer device 118 to communicate with the manager device 102 and/or to submit event data 116 that captures the detected events to the manager device 102. Because other modules and/or applications can be executed by the observer devices 118, it should be understood that this example is illustrative, and therefore should not be construed as being limiting in any way.

The event data 116 generated by the one or more observer devices 118 can include data describing various aspects of the detected events. In some embodiments, for example, the event data 116 can describe an identity of the entity (e.g., a user or device associated with a detected action or event); the action or event (e.g., a type of activity or action that was detected); a time associated with the action or event (e.g., a date and time of day the event occurred and/or a duration of the event, etc.); a geographic location at which the event occurred; and/or other information relating to the event. The observer devices 118 can capture and/or generate data describing these and/or other aspects of the event as the event data 116 and provide the event data 116 to the activity logging service 108 at the manager device 102. It should be understood that this example is illustrative, and therefore should not be construed as being limiting in any way.

The activity logging service 108 can be configured to receive the event data 116 at various times, such as upon occurrence of an event that prompted creation of the event data 116, at time intervals (e.g., each minute, hourly, daily, weekly, etc.), when a batch of events is detected (e.g., two, three, five, ten, etc.), and/or at other times. The activity logging service 108 can be configured to generate, based on the event data, one or more blocks or other records for the activity log 110. The blocks or other records can describe the event detected by the observer device 118 and encompassed by the event data 116. The activity logging service 108 can add the blocks or other records to the activity log 110 to capture the activity in the activity log 110, in some embodiments. The activity log 110 thus can represent a continuing log of activity for the entity that can be updated upon an occurrence of an event.

The activity logging service 108 can generate a hash of the activity log 110 in some embodiments to create the hash 122. In some other embodiments, the activity logging service 108 can generate a hash of a block or record of the activity log 110 to create the hash 122. In yet other embodiments, the activity logging service 108 can generate a hash of a block or record of the activity log 110, as well as a previous block or record of the activity log 110 to create the hash 122. The activity logging service 108 can send the hash 122 to a hash ledger storage service 124, which can be hosted and/or executed by a server computer 126.

The hash ledger storage service 124 can be configured to maintain one or more hash ledgers 128 for one or more users or other entities (e.g., a user associated with the user device 114). The hash ledgers 128 can correspond to hashed versions of one or more activity logs 110 in some embodiments. According to various embodiments of the concepts and technologies disclosed herein, the hash ledgers 128 can correspond to blockchain data structures that include hashed versions of the activity logs 110. According to various embodiments of the concepts and technologies disclosed herein, the hash 122 can be received and/or otherwise obtained by the hash ledger storage service 124 and appended to the hash ledger 128 by the hash ledger storage service 124. Thus, the hash ledger 128 associated with a particular entity can be updated by the hash ledger storage service 124 (e.g., by appending the hash 122 to the hash ledger 128) to create an updated hash ledger 128 at any particular time. Thus, the hash ledger 128 can correspond to an updated hashed version of the activity log 110 at any particular time. It should be understood that this example is illustrative, and therefore should not be construed as being limiting in any way.

In practice, a manager device 102 can be configured to host and/or execute an activity logging service 108. The activity logging service 108 can be configured to interface with one or more observer devices 118 to capture events and/or activities associated with an entity. The functionality of the activity logging service 108 can be configured, in some embodiments, via interactions between a user device 114 and the activity logging service 108. In various embodiments, the user device 114 can execute a manager application 112 to interact with the activity logging service 108 to configure the functionality of the activity logging service 108. Because other devices can be configured to interact with and/or control the activity logging service 108, it should be understood that this example is illustrative, and therefore should not be construed as being limiting in any way.

According to various embodiments of the concepts and technologies disclosed herein, one or more observer devices 118 can be identified and/or registered with the activity logging service 108 to capture events occurring in the proximity to the manager device 102 and/or the observer devices 118. According to various embodiments of the concepts and technologies disclosed herein, the activity logging service 108 also can be registered with the hash ledger storage service 124. It can be appreciated that the hash ledger storage service 124 can provide backup and verification functionality for the activity logging service 108. The hash ledger 128 can correspond to a hashed and secure version of the activity log 110. Thus, if a secure record of activity associated with an entity is needed or desired, the hash ledger 128 can be used to verify activity in a secure manner as the hash ledger 128 cannot be modified without detection. It should be understood that this example is illustrative, and therefore should not be construed as being limiting in any way.

The observer devices 118 can detect one or more events associated with one or more entities and generate, based on the events detected, event data 116 that represents the detected events. The observer device 118 can provide the event data 116 to the activity logging service 108. The activity logging service 108 can generate one or more blocks that can represent the events and add the blocks to the activity log 110. Thus, the activity log 110 can be updated to reflect the events detected by the observer devices 118. The activity logging service 108 can generate a hash 122 of the activity log 110 and/or the block of the activity log 110 (and, in some embodiments the hash 122 can include the block, a previous block, and/or metadata or other information). The activity logging service 108 can provide the hash 122 to a hash ledger storage service 124, and the hash ledger storage service 124 can append the hash 122 to the hash ledger 128. The hash ledger 128 can provide a verifiable and authenticatable version of the activity log 110. It should be understood that this example is illustrative, and therefore should not be construed as being limiting in any way.

FIG. 1 illustrates one manager device 102, one network 104, one user device 114, two observer devices 118, and one server computer 126. It should be understood, however, that various implementations of the operating environment 100 can include one or more than one manager device 102; zero, one, or more than one network 104; zero, one, or more than one user device 114; one, two, or more than two observer devices 118; and/or zero, one, or more than one server computer 126. As such, the illustrated embodiment should be understood as being illustrative, and should not be construed as being limiting in any way.

Figure 2:
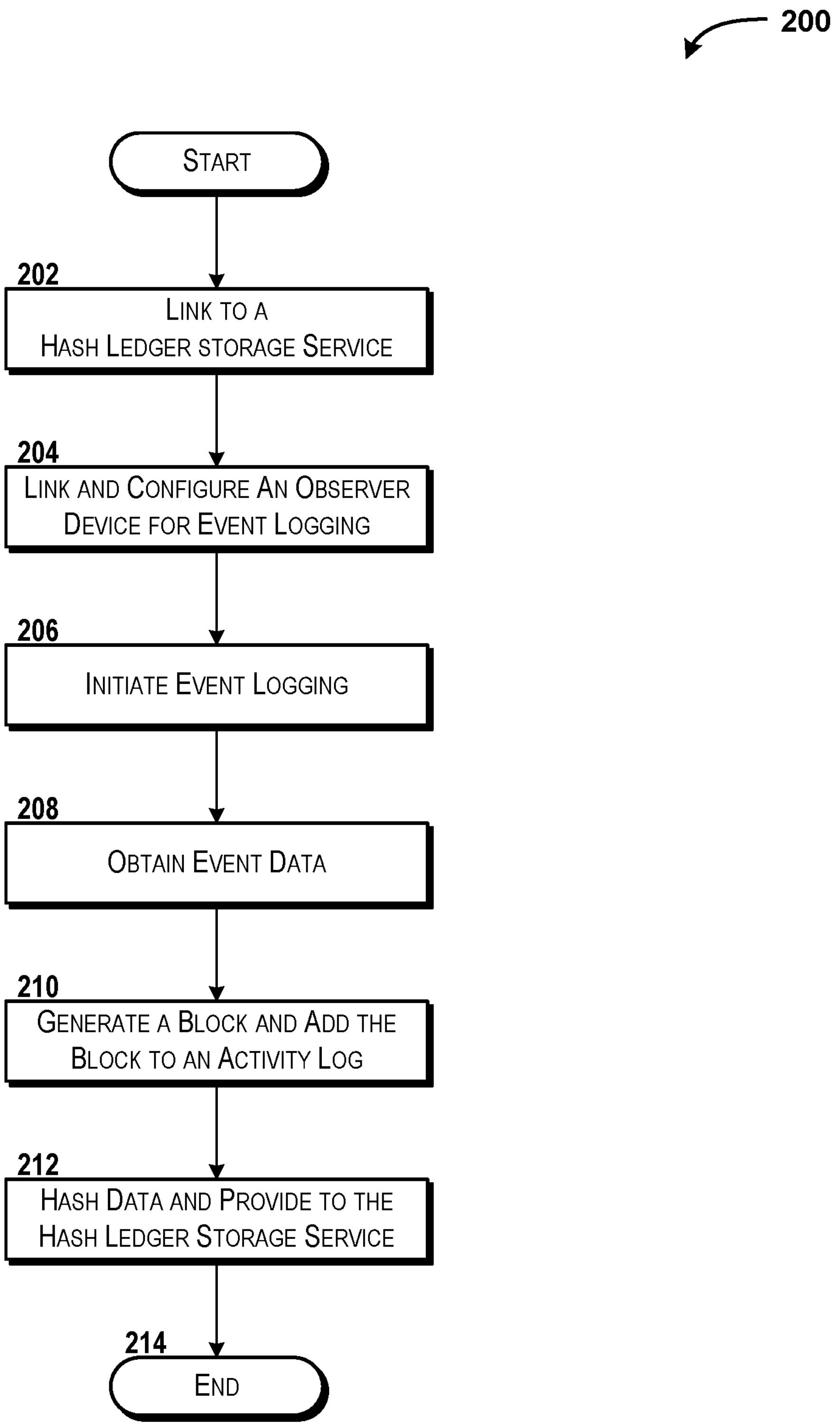
FIG. 2 is a flow diagram showing aspects of a method for providing an activity logging service, according to an illustrative embodiment of the concepts and technologies described herein.

Turning now to FIG. 2, aspects of a method 200 for providing an activity logging service 108 will be described in detail, according to an illustrative embodiment. It should be understood that the operations of the methods disclosed herein are not necessarily presented in any particular order and that performance of some or all of the operations in an alternative order(s) is possible and is contemplated. The operations have been presented in the demonstrated order for ease of description and illustration. Operations may be added, omitted, and/or performed simultaneously, without departing from the scope of the concepts and technologies disclosed herein.

It also should be understood that the methods disclosed herein can be ended at any time and need not be performed in its entirety. Some or all operations of the methods, and/or substantially equivalent operations, can be performed by execution of computer-readable instructions included on a computer storage media, as defined herein. The term "computer-readable instructions," and variants thereof, as used herein, is used expansively to include routines, applications, application modules, program modules, programs, components, data structures, algorithms, and the like. Computer-readable instructions can be implemented on various system configurations including single-processor or multiprocessor systems, minicomputers, mainframe computers, personal computers, hand-held computing devices, microprocessor-based, programmable consumer electronics, combinations thereof, and the like.

Thus, it should be appreciated that the logical operations described herein are implemented (1) as a sequence of computer implemented acts or program modules running on a computing system and/or (2) as interconnected machine logic circuits or circuit modules within the computing system. The implementation is a matter of choice dependent on the performance and other requirements of the computing system. Accordingly, the logical operations described herein are referred to variously as states, operations, structural devices, acts, or modules. These states, operations, structural devices, acts, and modules may be implemented in software, in firmware, in special purpose digital logic, and any combination thereof. As used herein, the phrase "cause a processor to perform operations" and variants thereof is used to refer to causing a processor of a computing system or device, such as the manager device 102, the user device 114, an observer device 118, and/or the server computer 126, to perform one or more operations and/or causing the processor to direct other components of the computing system or device to perform one or more of the operations.

For purposes of illustrating and describing the concepts of the present disclosure, the method 200 is described herein as being performed by the manager device 102 via execution of one or more software modules such as, for example, the activity logging service 108. It should be understood that additional and/or alternative devices and/or network nodes can provide the functionality described herein via execution of one or more modules, applications, and/or other software including, but not limited to, the activity logging service 108. Thus, the illustrated embodiments are illustrative, and should not be viewed as being limiting in any way.

The method 200 begins at operation 202. At operation 202, the manager device 102 can link to a hash ledger storage service 124. According to various embodiments of the concepts and technologies disclosed herein, the manager device 102 can link to a hash ledger storage service 124 as part of an application installation and/or activation process, while in some other embodiments a hash ledger storage service 124 can be linked at any time. According to various embodiments of the concepts and technologies disclosed herein, a user or other entity can access the activity logging service 108 to configure logging of events and/or activities as illustrated and described herein. During the registration process and/or at other times, the activity logging service 108 can be linked to a hash ledger storage service 124. Because the linking of the manager device 102 (and/or the activity logging service 108) to the hash ledger storage service 124 can occur at any time, it should be understood that this example is illustrative, and therefore should not be construed as being limiting in any way.

From operation 202, the method 200 can proceed to operation 204. At operation 204, the manager device 102 can link and configure an observer device 118 for event logging. In various embodiments, the functionality of operation 204 can be invoked by a device (e.g., the user device 114) requesting scanning for observer devices 118. In some other embodiments, one or more observer devices 118 can be identified by one or more devices (e.g., a user of the user device 114). For example, a user device 114 can provide, to the manager device 102, a MAC address, IP address, and/or other identifiers that can be used to identify one or more observer devices 118. Thus, operation 204 can include in some embodiments the manager device 102 identifying an observer device 118 to be linked to the activity logging service 108, establishing contact with the observer device 118 identified, and configuring the observer device 118 for event logging. It should be understood that this example is illustrative, and therefore should not be construed as being limiting in any way.

From operation 204, the method 200 can proceed to operation 206. At operation 206, the manager device 102 can initiate event logging by the activity logging service 108. Operation 206 can correspond to the manager device 102 initiating logging of events (e.g., in response to receiving event data 116 from one or more observer devices 118) and/or to trigger one or more observer devices 118 to log events and/or generate event data 116. Thus, operation 206 can correspond, in some embodiments, to instructing the observer devices 118 to log events and/or generate the event data 116. Because the observer devices 118 can be configured to log events without any request or instruction to do so, it should be understood that this example is illustrative, and therefore should not be construed as being limiting in any way.

From operation 206, the method 200 can proceed to operation 208. At operation 208, the manager device 102 can receive event data 116. In various embodiments, the event data 116 can be provided to the manager device 102 by one or more observer devices 118, for example, the observer devices 118 linked in operation 204. It should be understood that the event data 116 can be provided to the manager device 102 at various times such as, for example, each time an event is detected; at various time intervals (e.g., hourly, daily, weekly, etc.); in batches (e.g., after capturing a set number of events); and/or at other times. Thus, it should be understood that the event data 116 received or otherwise obtained in operation 208 can represent one or more events in various embodiments. As such, it should be understood that this example is illustrative, and therefore should not be construed as being limiting in any way.

From operation 208, the method 200 can proceed to operation 210. At operation 210, the manager device 102 can generate a block (that represents the detected event) and add the block to an activity log 110 that can represent activities and/or events associated with a particular device and/or entity (e.g., a user of the user device 114). Thus, operation 210 can correspond to the manager device 102 generating a block that represents the event represented by the event data 116 received in operation 208. It can be appreciated that in some embodiments of the concepts and technologies disclosed herein, the block generated in operation 210 can include a) data that represents an entity (e.g., an identity of the entity associated with an action or event); b) data that describes the action or event (e.g., a type of activity or action that was detected); c) data that defines a time associated with the action or event (e.g., a date and time of day the event occurred, a duration of the event, etc.); d) data describing a geographic location at which the event occurred; and/or e) other information relating to the event. These and/or other data can be included in and/or represented by the event data 116 obtained in operation 208, in some embodiments.

According to various embodiments of the concepts and technologies disclosed herein, the manager device 102 can create a block containing relevant information relating to the event (e.g., the information noted above) when an event is detected or at other times. This block can be added to the activity log 110. Thus, it can be appreciated that the activity log 110 can grow over time (e.g., a new block can be appended to the activity log 110 each time a new block is created based on event data 116, etc.). It should be understood that this example is illustrative, and therefore should not be construed as being limiting in any way.

In some embodiments of the concepts and technologies disclosed herein, the activity log 110 can represent all activity since creation of the activity log 110, and in some other embodiments the activity log 110 can include a circular buffer or other storage structure. According to some embodiments, a circular buffer, or the like, can include data storage in a sliding window of time (e.g., a year, two years, etc.) of activity. Thus, activity may be represented in the circular buffer, and oldest blocks or events can be removed from the activity log 110 when a time associated with the events represented by those blocks is no longer encompassed by the sliding window, etc. It should be understood that this example is illustrative, and therefore should not be construed as being limiting in any way. At any rate, operation 210 can correspond to the activity log 110 being updated based on the received event data 116. It should be understood that this example is illustrative, and therefore should not be construed as being limiting in any way.

From operation 210, the method 200 can proceed to operation 212. At operation 212, the manager device 102 can generate a hash 122 and provide the hash 122 to the hash ledger storage service 124. According to various embodiments of the concepts and technologies disclosed herein, the new block created at operation 210 can be hashed along with the previous block (from the activity log 110) and metadata (e.g., defining a time, location, etc.) to create the hash 122. This hash 122 can be provided by the manager device 102 to the hash ledger storage service 124 for storage and/or archiving. Thus, it can be appreciated that the hash 122 in some embodiments can include a hash version of the activity log 110 in some embodiments, while in some other embodiments the hash 122 may only include the most recently created block and/or a previous block of the activity log 110. Because the hash 122 can be generated based on various types of information and/or data, it should be understood that these examples are illustrative, and therefore should not be construed as being limiting in any way.

From operation 212, the method 200 can proceed to operation 214. The method 200 can end at operation 214.

Figure 3:
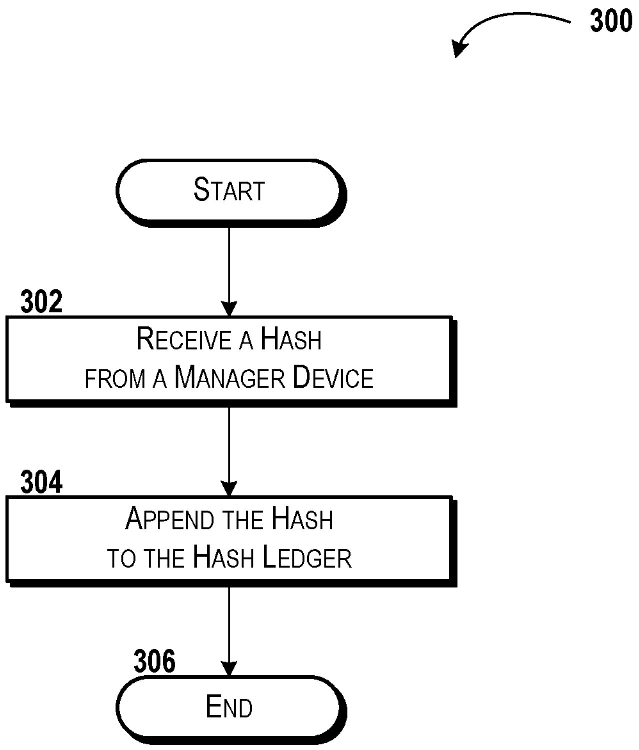
FIG. 3 is a flow diagram showing aspects of a method for updating a hash ledger using an activity logging service, according to an illustrative embodiment of the concepts and technologies described herein.

Turning now to FIG. 3, aspects of a method 300 for updating a hash ledger 128 using an activity logging service 108 will be described in detail, according to an illustrative embodiment. For purposes of illustrating and describing the concepts of the present disclosure, the method 300 is described herein as being performed by the server computer 126 via execution of one or more software modules such as, for example, the hash ledger storage service 124. It should be understood that additional and/or alternative devices and/or network nodes can provide the functionality described herein via execution of one or more modules, applications, and/or other software including, but not limited to, the hash ledger storage service 124. Thus, the illustrated embodiments are illustrative, and should not be viewed as being limiting in any way.

The method 300 begins at operation 302. At operation 302, the server computer 126 can receive a hash 122 from a manager device 102. As noted above, the hash 122 received or otherwise obtained in operation 302 can correspond to a hash version of the activity log 110 and/or to a hash of a most recently added block of the activity log 110 and/or a previous block of the activity log 110, if desired. In some embodiments of the concepts and technologies disclosed herein a timeline of logs (e.g., blocks corresponding to events) can be aggregated and logged and stored in a blockchain data structure. Thus, once a new block or event is represented by data and added to the blockchain, a user or other entity will be unable to destroy or edit the log without destroying the chain after a record being edited or removed. Thus, embodiments of the concepts and technologies disclosed herein can provide a verifiable record of activity of a particular user, entity, place, or the like. It should be understood that this example is illustrative, and therefore should not be construed as being limiting in any way.

From operation 302, the method 300 can proceed to operation 304. At operation 304, the server computer 126 can append the hash 122 received in operation 302 to a hash ledger 128. In operation 304, the hash ledger storage service 124 can append the received hash 122 to a hash ledger 128 (e.g., a hashed version of the activity log 110 at a particular time). This hash ledger 128 can correspond, at any particular time, a hashed version of the activity log 110, and therefore can be authenticated as this hash ledger 128 may be unmodifiable without destroying the whole hash ledger 128. It should be understood that this example is illustrative, and therefore should not be construed as being limiting in any way.

From operation 304, the method 300 can proceed to operation 306. The method 300 can end at operation 306.

Figure 4:
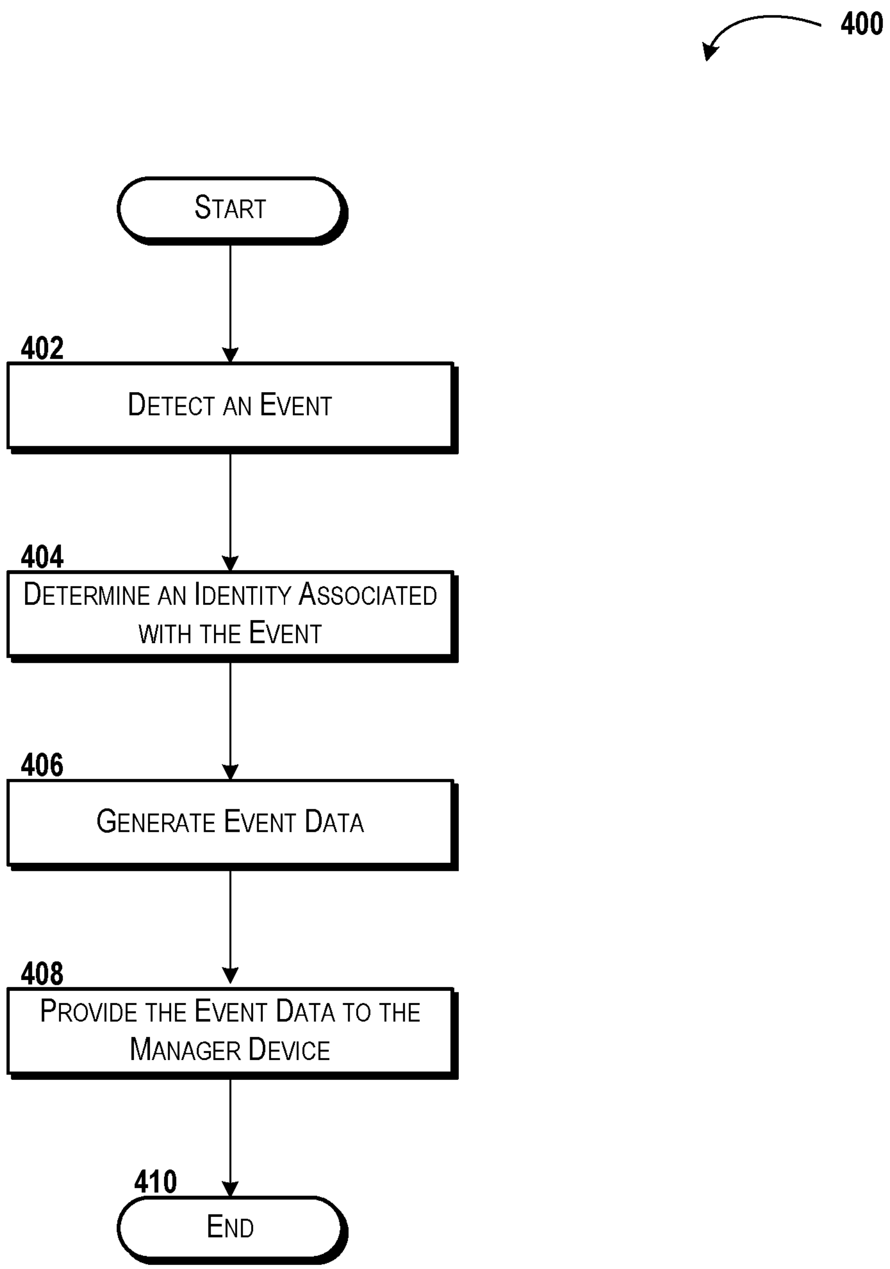
FIG. 4 is a flow diagram showing aspects of a method for providing event data to an activity logging service, according to an illustrative embodiment of the concepts and technologies described herein.

Turning now to FIG. 4, aspects of a method 400 for providing event data 116 to an activity logging service 108 will be described in detail, according to an illustrative embodiment. For purposes of illustrating and describing the concepts of the present disclosure, the method 400 is described herein as being performed by an observer device 118 via execution of one or more software modules such as, for example, the event logging application 120. It should be understood that additional and/or alternative devices and/or network nodes can provide the functionality described herein via execution of one or more modules, applications, and/or other software including, but not limited to, the event logging application 120. Thus, the illustrated embodiments are illustrative, and should not be viewed as being limiting in any way.

The method 400 begins at operation 402. At operation 402, the observer device 118 can detect an event. According to various embodiments, the observer device 118 can detect a movement, an activity, a state, or the like. In some embodiments, the event can be detected by detecting a motion of an entity (e.g., a person entering, moving within, exiting a location, or the like); by detecting a lack of motion (e.g., a person sitting in one place, sleeping, or the like); by detecting a change in state (e.g., sitting to standing, walking to stopping, sleeping to waking, or the like); by detecting audio (e.g., speaking, singing, or the like); by detecting electronic activity (e.g., detecting video, audio, a communication, or the like); and/or other activity associated with an entity. Because various types of activities and/or events can be detected in accordance with various embodiments of the concepts and technologies disclosed herein, it should be understood that the above examples are illustrative of only some types of events and should not be construed as being limiting in any way.

From operation 402, the method 400 can proceed to operation 404. At operation 404, the observer device 118 can determine an identity associated with the event detected in operation 402. According to various embodiments of the concepts and technologies disclosed herein, the identity of a person or actor (associated with the event detected in operation 402) can be determined in a number of ways such as, for example, recognizing the person by way of one or more biometric identifiers (e.g., facial recognition, voice-print identification, retinal scanning, fingerprint scanning, or the like); by way of one or more device identifiers (e.g., a MAC address, IP address, IMSI or IMEI associated with a device of the entity, or the like); a login and/or authentication information associated with the entity; combinations thereof; or the like. Thus, operation 404 can correspond to identifying an entity associated with the event. Because an entity such as a person can be identified in many ways, it should be understood that the above examples are illustrative, and therefore should not be construed as being limiting in any way.

From operation 404, the method 400 can proceed to operation 406. At operation 406, the observer device 118 can generate event data 116 that describes the detected event. According to various embodiments, the observer device 118 can capture various types of information associated with the detected event such as an identity of the entity associated with event, a description of the event, a time at which the event occurred (and/or a duration of the event), a location at which the event occurred, and/or other information relating to the event. In operation 406, the observer device 118 can create event data 116 that encompasses these and/or other data. Thus, it can be appreciated that the event data 116 generated in operation 406 can include, but is not limited to, a) data that represents an identity of the entity associated with an event; b) a description of the action or event (e.g., a type of activity or action that is detected); c) a time associated with the action or event such as a date and time of day of the event, a duration of the event, etc.; d) a location at which the event occurred; and/or e) other information relating to the event. Because the event data 116 can include other information as illustrated and described herein, it should be understood that this example embodiment of the event data 116 is illustrative and should not be construed as being limiting in any way.

From operation 406, the method 400 can proceed to operation 408. At operation 408, the observer device 118 can provide the event data 116 generated in operation 406 to the manager device 102. Thus, operation 408 can correspond to the observer device 118 reporting the event detected in operation 402 to the manager device 102. According to various embodiments of the concepts and technologies disclosed herein, the event data 116 can be provided by the observer device 118 to the manager device 102 each time an event is detected; at various time intervals (e.g., hourly, daily, weekly, etc.); in batches (e.g., after capturing a set number of events); and/or at other times. Thus, it should be understood that the event data 116 provided in operation 408 can represent one or more events in various embodiments. As such, it should be understood that this example is illustrative, and therefore should not be construed as being limiting in any way.

From operation 408, the method 400 can proceed to operation 410. The method 400 can end at operation 410.

Figure 5A:
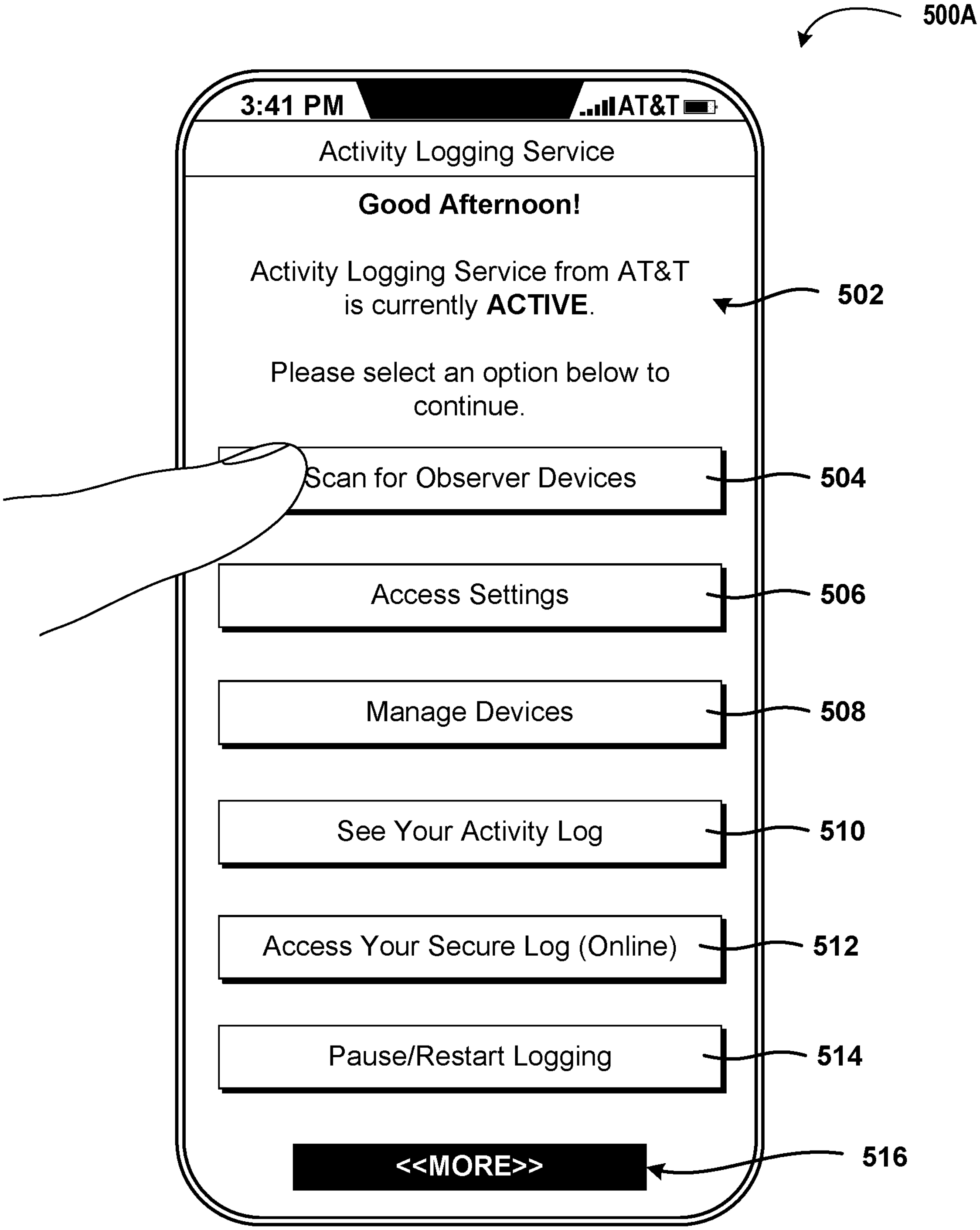
FIGS. 5A-5C are user interface diagrams showing various screen displays for interacting with an activity logging service, according to some illustrative embodiments of the concepts and technologies described herein.
Figure 5B:
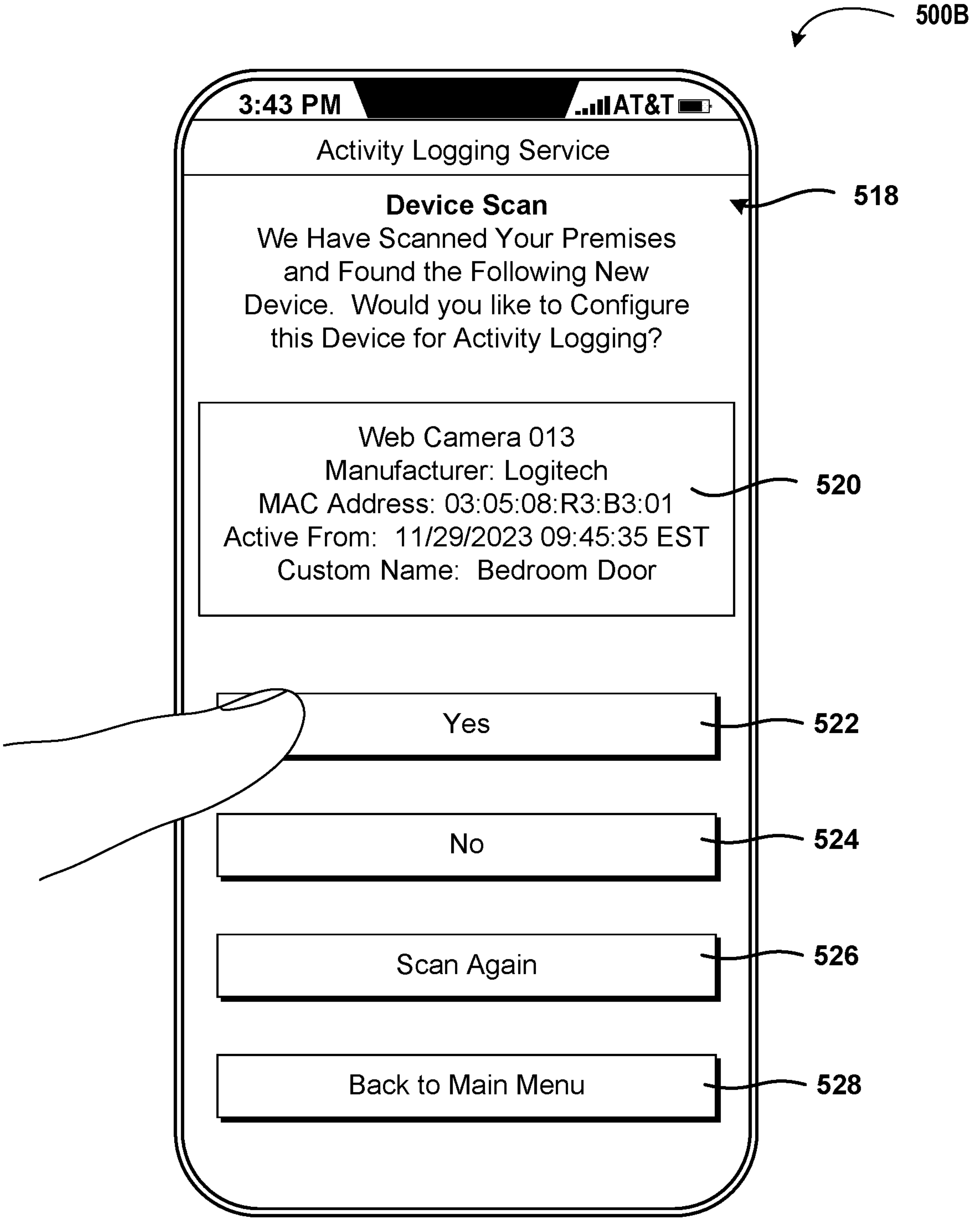
Figure 5C:
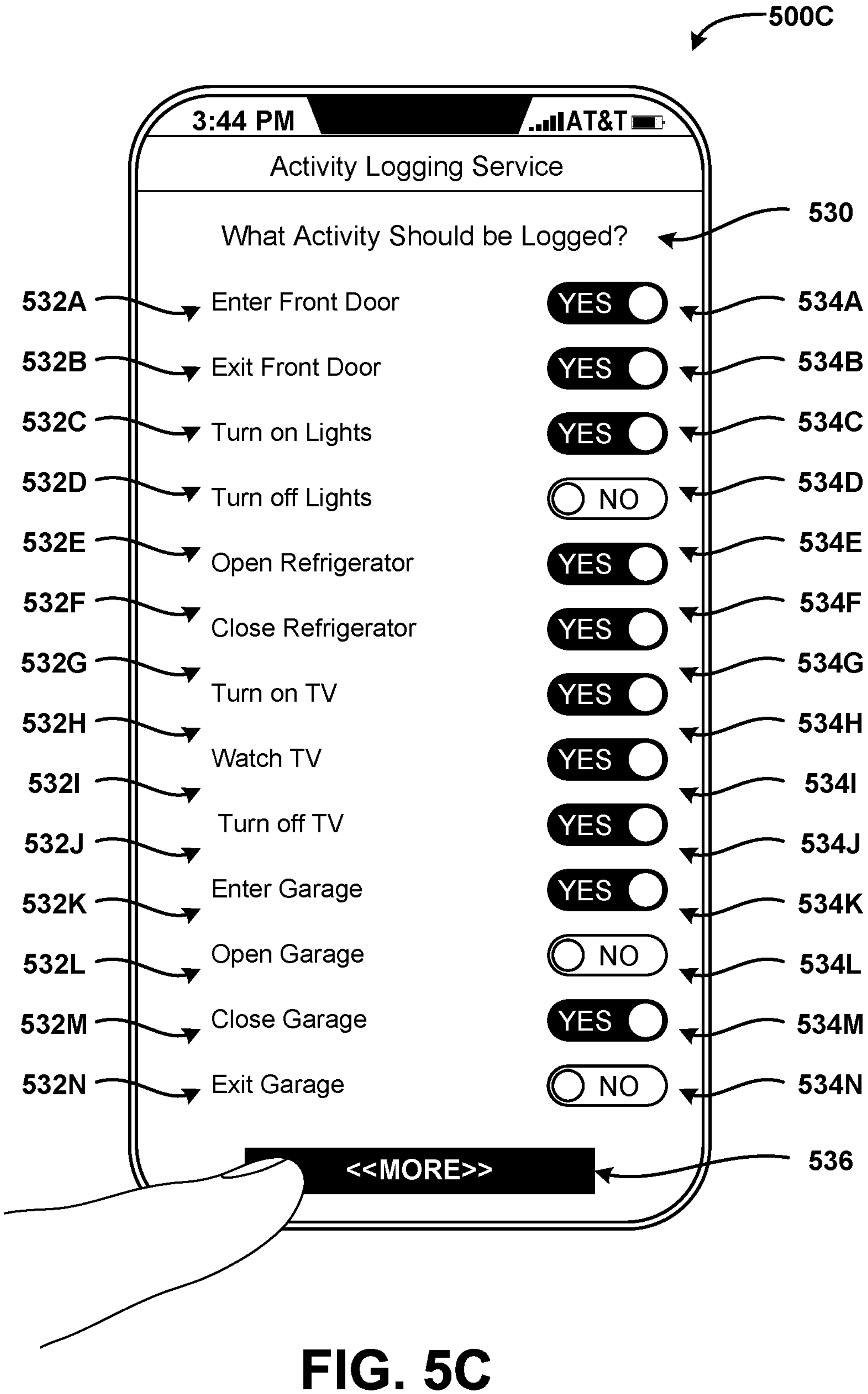

FIGS. 5A-5C are user interface ("UI") diagrams showing aspects of UIs for using and/or interacting with an activity logging service 108, according to some illustrative embodiments. FIG. 5A shows an illustrative screen display 500A. According to some embodiments of the concepts and technologies described herein, the screen display 500A can be generated by a device such as the user device 114 via interactions with the activity logging service 108. In particular, according to various embodiments, the user device 114 can generate the screen display 500A and/or other screen displays in conjunction with and/or based upon interactions with the activity logging service 108 described herein, which can be configured to render the screen display 500A using data generated at the user device 114, the manager device 102, and/or using data provided by the activity logging service 108. Because the illustrated screen display 500A can be displayed at additional and/or alternative times, it should be understood that this example is illustrative, and therefore should not be construed as being limiting in any way. In some embodiments, the screen display 500A can be generated in response to a user device 114 requesting scanning of an area for one or more observer devices 118. It should be appreciated that the UI diagram illustrated in FIG. 5A is illustrative of one contemplated example of the UIs that can be generated and/or displayed in accordance with the concepts and technologies disclosed herein, and therefore should not be construed as being limiting in any way.

According to various embodiments, the screen display 500A can be presented, for example, when a request to register an observer device 118 is detected by the user device 114 and/or the manager device 102. Because the screen display 500A illustrated in FIG. 5A can be displayed at additional and/or alternative times, it should be understood that these examples are illustrative and therefore should not be construed as being limiting in any way.

The screen display 500A can include various menus and/or menu options (not shown in FIG. 5A). The screen display 500A also can include an activity logging service preferences window 502. The activity logging service preferences window 502 can be configured to provide various functions for configuring and/or managing the activity logging service 108. In the illustrated embodiment, the activity logging service preferences window 502 can provide a welcome message, which in some embodiments can include a status of the activity logging service 108. In the illustrated embodiment, the status is indicated as active. It should be understood that this example is illustrative, and therefore should not be construed as being limiting in any way. Because additional and/or alternative information about the activity logging service 108 can be included in the welcome message, it should be understood that this example is illustrative, and therefore should not be construed as being limiting in any way.

The activity logging service preferences window 502 also can include a UI control 504 for scanning an area (e.g., an area around the manager device 102 and/or the user device 114) for devices that are capable of functioning as the observer devices 118. Selection of the UI control 504 can cause the user device 114 and/or the manager device 102 to initiate a scan for an observer device 118. It should be understood that this example is illustrative and therefore should not be construed as being limiting in any way.

The activity logging service preferences window 502 also can include a UI control 506. The UI control 506 can be selected at the user device 114 to cause the user device 114 and/or the manager device 102 to access settings and/or configurations associated with the activity logging service 108. Thus, selection of the UI control 506 can cause the user device 114 and/or the manager device 102 to present a settings and/or configuration screen, an example of which is illustrated and described below with reference to FIG. 5C. It should be understood that this example is illustrative and therefore should not be construed as being limiting in any way.

The activity logging service preferences window 502 also can include a UI control 508. The UI control 508 can be selected at the user device 114 to cause the user device 114 and/or the manager device 102 to manage one or more observer devices 118 and/or one or more other devices such as the manager device 102. Thus, for example, selection of the UI control 508 can cause the user device 114 and/or the manager device 102 to access various settings, configurations, event triggers, and/or other settings associated with one or more observer devices 118 (and/or the manager device 102). It should be understood that this example is illustrative and therefore should not be construed as being limiting in any way.

The activity logging service preferences window 502 also can include a UI control 510. The UI control 510 can be selected at the user device 114 to cause the user device 114 and/or the manager device 102 to display an activity log 110 that has been generated and/or maintained by the activity logging service 108. Thus, selection of the UI control 510 can cause the user device 114 and/or the manager device 102 to obtain the activity log 110 and/or a portion thereof and present the activity log 110 and/or portion thereof at the user device 114. It should be understood that this example is illustrative and therefore should not be construed as being limiting in any way.

The activity logging service preferences window 502 also can include a UI control 512. The UI control 512 can be selected at the user device 114 to cause the user device 114 and/or the manager device 102 to display an online version of the activity log 110 (e.g., the log represented by the hash ledger 128) that has been generated and/or maintained by the activity logging service 108. Thus, selection of the UI control 512 can cause the user device 114 and/or the manager device 102 to obtain the hash ledger 128 and present the associated log at the user device 114. It should be understood that this example is illustrative and therefore should not be construed as being limiting in any way.

The activity logging service preferences window 502 also can include a UI control 514. The UI control 514 can be selected at the user device 114 to cause the user device 114 and/or the manager device 102 to pause and/or restart logging of events by the activity logging service 108. In some embodiments, specific observer devices 118 can be activated and/or deactivated and/or the functionality of the activity logging service 108 as a whole can be paused and/or restarted. Thus, selection of the UI control 514 can cause the user device 114 and/or the manager device 102 to pause logging of events (if logging of events is active at that time) by the activity logging service 108; or to start/restart logging of events (if logging of events is inactive at that time) by the activity logging service 108. It should be understood that this example is illustrative and therefore should not be construed as being limiting in any way.

FIG. 5B shows an illustrative screen display 500B. According to some embodiments of the concepts and technologies described herein, the screen display 500B can be generated by a device such as the user device 114 via interactions with the activity logging service 108. In particular, according to various embodiments, the user device 114 can generate the screen display 500B and/or other screen displays in conjunction with and/or based upon interactions with the activity logging service 108 described herein, which can be configured to render the screen display 500B using data generated at the user device 114, the manager device 102, and/or using data provided by the activity logging service 108. Because the illustrated screen display 500B can be displayed at additional and/or alternative times, it should be understood that this example is illustrative, and therefore should not be construed as being limiting in any way. In some embodiments, the screen display 500B can be generated in response to a user device 114 requesting scanning of an area for one or more observer devices 118. It should be appreciated that the UI diagram illustrated in FIG. 5B is illustrative of one contemplated example of the UIs that can be generated and/or displayed in accordance with the concepts and technologies disclosed herein, and therefore should not be construed as being limiting in any way.

According to various embodiments, the screen display 500B can be presented, for example, when a request to register an observer device 118 is detected by the user device 114 and/or the manager device 102. Because the screen display 500B illustrated in FIG. 5B can be displayed at additional and/or alternative times, it should be understood that these examples are illustrative and therefore should not be construed as being limiting in any way.

The screen display 500B can include various menus and/or menu options (not shown in FIG. 5B). The screen display 500B also can include an observer device registration window 518. The observer device registration window 518 can be configured to provide and obtain information about one or more observer devices 118 at various times such as, for example, registration of one or more of the observer devices 118 illustrated and described herein. The observer device registration window 518 can include a device details field 520, which can include various data and/or information about a particular observer device 118 (e.g., an observer device 118 being registered). In the illustrated embodiment, the device details field 520 is illustrated as including a device type description (e.g., "Web Camera 013"); a manufacturer name (e.g., "Logitech"); a media access control ("MAC") address (e.g., 03:05:08:

R3B3:01); an active from indicator (e.g., Nov. 29, 2023 at 9:45:35 EST); and a custom name (e.g., "Bedroom Door"). Because additional and/or alternative information about an observer device 118 can be included in the device details field 520, it should be understood that this example is illustrative, and therefore should not be construed as being limiting in any way.

The observer device registration window 518 can include a prompt that can question a user whether the user wishes to register the observer device 118 detailed in the device details field 520 for event logging and one or more UI controls that can be used to answer this question and/or to perform other operations. In the illustrated embodiment, the observer device registration window 518 includes a UI control 522. The UI control 522 can be used to initiate logging using the observer device 118 identified in the observer device registration window 518 (e.g., an observer device 118 identified during a scan for observer devices 118). Thus, selection of the UI control 522 can cause the manager device 102 to register the observer device 118 identified in the observer device registration window 518 for event logging. It should be understood that this example is illustrative and therefore should not be construed as being limiting in any way.

In the illustrated embodiment, the observer device registration window 518 also can include a UI control 524. The UI control 524 can be used to indicate that logging using the observer device 118 identified in the observer device registration window 518 (e.g., an observer device 118 identified during a scan for observer devices 118) is not to be initiated. Thus, selection of the UI control 524 can cause the manager device 102 to cancel or otherwise not register the observer device 118 identified in the observer device registration window 518 for event logging. It should be understood that this example is illustrative and therefore should not be construed as being limiting in any way.

The observer device registration window 518 also can include a UI control 526 to cause the user device 114 or the manager device 102 to scan for observer devices 118. In some embodiments of the concepts and technologies disclosed herein, selection of the UI control 526 can cause the user device 114 and/or the manager device 102 (e.g., via a request or prompt that can be sent to the manager device 102) to scan for observer devices 118.

The observer device registration window 518 also can include a UI control 528 that, when selected at the user device 114 and/or the manager device 102, can cause the user device 114 to display a main menu screen such as the screen display 500A illustrated and described above with reference to FIG. 5A. Because additional or alternative controls can be included in the observer device registration window 518, it should be understood that the example embodiment shown in FIG. 5B is illustrative and therefore should not be construed as being limiting in any way.

FIG. 5C shows an illustrative screen display 500C. According to some embodiments of the concepts and technologies described herein, the screen display 500C can be generated by a device such as the user device 114 via interactions with the activity logging service 108. In particular, according to various embodiments, the user device 114 can generate the screen display 500C and/or other screen displays in conjunction with and/or based upon interactions with the activity logging service 108 described herein, which can be configured to render the screen display 500C using data generated at the user device 114, the manager device 102, and/or using data provided by the activity logging service 108. It should be appreciated that the UI diagram illustrated in FIG. 5C is illustrative of one contemplated example of the UIs that can be generated and/or displayed in accordance with the concepts and technologies disclosed herein, and therefore should not be construed as being limiting in any way.

According to various embodiments, the screen display 500C can be presented, for example, in response to a user or other entity selecting an option to configure settings or preferences associated with the activity logging service 108 is detected by the user device 114 and/or the manager device 102. Because the screen display 500C illustrated in FIG. 5C can be displayed at additional and/or alternative times, it should be understood that these examples are illustrative and therefore should not be construed as being limiting in any way.

The screen display 500C can include various menus and/or menu options (not shown in FIG. 5C). The screen display 500C also can include an activity logging service preferences window 530. The activity logging service preferences window 530 can be used to set, modify, and/or configure various preferences and/or settings associated with the activity logging service 108. As shown in FIG. 5C, the activity logging service preferences window 530 can include one or more event/device identifier 532A-N (hereinafter collectively and/or generically referred to as "event/device identifiers 532"). The illustrated event/device identifiers 532 are illustrative of some events that can be detected to generate events as illustrated and described herein. Because additional and/or alternative events can prompt logging of events by one or more observer devices 118, it should be understood that the illustrated example event/device identifiers 532 are illustrative, and therefore should not be construed as being limiting in any way.

In some embodiments, as illustrated in FIG. 5C, the event/device identifiers 532 can correspond to one or more event logging selectors 534A-N (hereinafter collectively and/or generically referred to as "event logging selectors 534"). The event logging selectors 534 can be used to selectively activate and/or deactivate event logging for various events associated with the event/device identifiers 532. Because additional and/or alternative events can prompt logging of events, it should be understood that the illustrated example is illustrative, and therefore should not be construed as being limiting in any way.

The activity logging service preferences window 530 can include a prompt that can question a user or other entity as to what events the user wishes to prompt event logging using one or more registered observer devices 118. It can be appreciated that detecting selection of an event logging selector 534 (e.g., the event logging selector 534A) can cause the manager device 102 to activate or deactivate logging of events using the observer device 118 associated with the respective event/device identifier 532 (e.g., the event/device identifier 532A). Thus, for example, selection of the event logging selector 534A can, when detected by the manager device 102, cause the manager device 102 (or an observer device 118) to create an event if someone enters a front door. It should be understood that this example is illustrative, and therefore should not be construed as being limiting in any way.

The activity logging service preferences window 530 also can include a UI control 536 to cause the user device 114 to display more event/device identifiers 532 and/or event logging selectors 534. In some embodiments of the concepts and technologies disclosed herein, selection of the UI control 536 can cause the user device 114 and/or the manager device 102 (e.g., via a request or prompt that can be sent to the manager device 102) to provide data identifying devices and/or events that will prompt event logging and/or preferences for activating and/or deactivating logging of events based on those events and/or devices. Because additional or alternative controls can be included in the activity logging service preferences window 530, it should be understood that the example embodiment shown in FIG. 5C is illustrative and therefore should not be construed as being limiting in any way.

According to various embodiments of the concepts and technologies disclosed herein in which a user can be enabled to activate and/or deactivate the functionality illustrated and described herein for logging activity (e.g., activating and/or deactivating the activity logging service 108), the activation and/or deactivation of the activity logging can be tracked and/or logged as activity of the user since intentionally activating logging of events (and/or intentionally stopping logging of events) can be interesting and/or significant. For example, a user deactivating the activity logging service 108 may be interpreted, in some embodiments, as the user attempting to block logging of some activity. Clearly this interpretation could be wrong and/or may not apply in all embodiments, so it should be understood that this example is illustrative, and therefore should not be construed as being limiting in any way. It also should be noted that event data 116 can be obtained from other sources of data (e.g., other than the observer devices 118). For example, cellular connection data can be obtained in some embodiments and used to track movements and/or activity of devices in addition to, or instead of, the event data 116. In yet other embodiments, the event data 116 can be verified and/or correlated to external data (e.g., cellular connection data, automobile data, etc.) to increase a confidence in the events determined and/or for other reasons. It should be understood that this example is illustrative, and therefore should not be construed as being limiting in any way.

Figure 6:
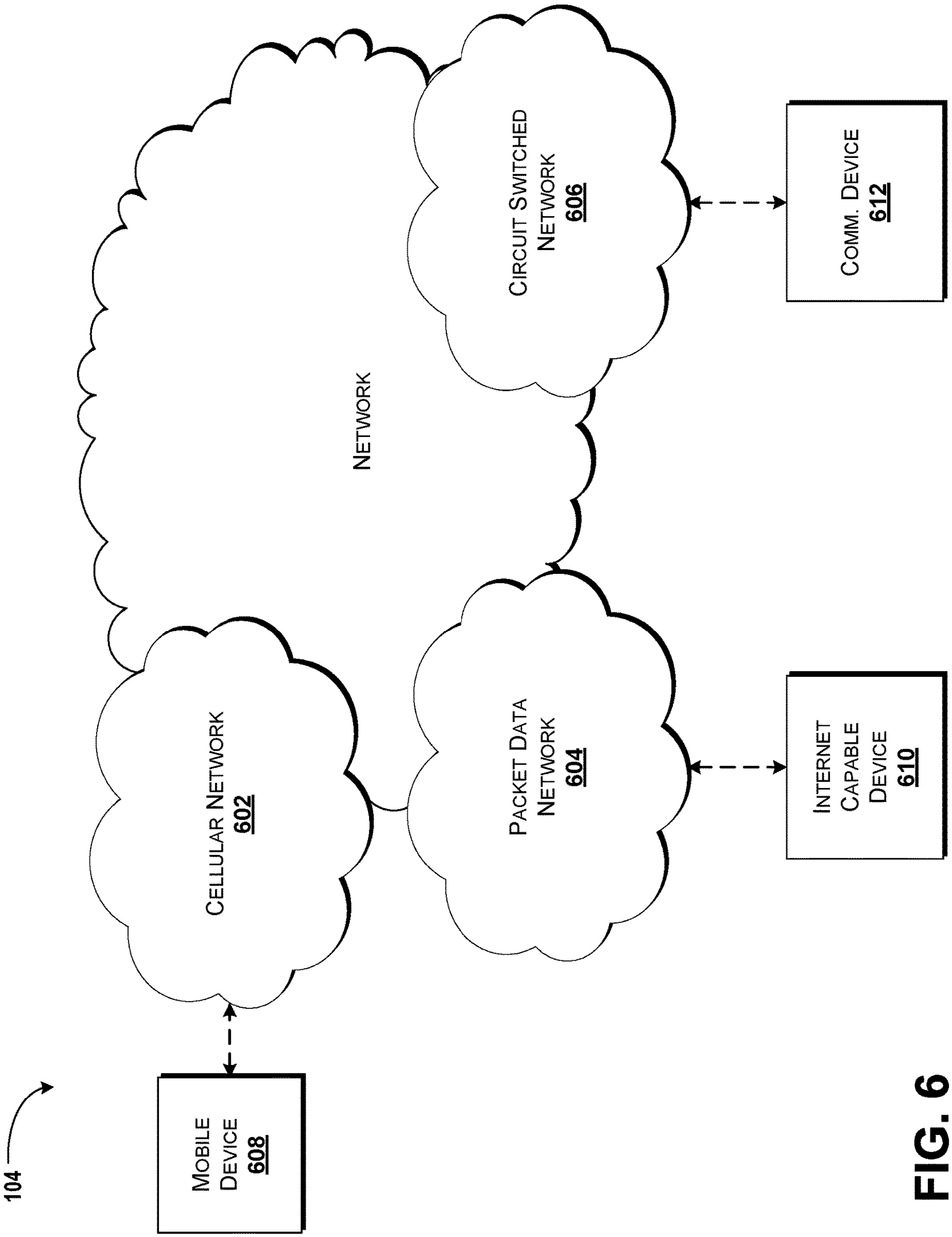
FIG. 6 schematically illustrates a network, according to an illustrative embodiment of the concepts and technologies described herein.

Turning now to FIG. 6, additional details of the network 104 are illustrated, according to an illustrative embodiment. The network 104 includes a cellular network 602, a packet data network 604, for example, the Internet, and a circuit switched network 606, for example, a publicly switched telephone network ("PSTN"). The cellular network 602 includes various components such as, but not limited to, base transceiver stations ("BTSs"), Node-B's or e-Node-B's, base station controllers ("BSCs"), radio network controllers ("RNCs"), mobile switching centers ("MSCs"), mobile management entities ("MMEs"), short message service centers ("SMSCs"), multimedia messaging service centers ("MMSCs"), home location registers ("HLRs"), home subscriber servers ("HSSs"), visitor location registers ("VLRs"), charging platforms, billing platforms, voicemail platforms, GPRS core network components, location service nodes, an IP Multimedia Subsystem ("IMS"), and the like. The cellular network 602 also includes radios and nodes for receiving and transmitting voice, data, and combinations thereof to and from radio transceivers, networks, the packet data network 604, and the circuit switched network 606.

A mobile communications device 608, such as, for example, a cellular telephone, a user equipment, a mobile terminal, a PDA, a laptop computer, a handheld computer, and combinations thereof, can be operatively connected to the cellular network 602. The cellular network 602 can be configured as a 2G GSM network and can provide data communications via GPRS and/or EDGE. Additionally, or alternatively, the cellular network 602 can be configured as a 3G UMTS network and can provide data communications via the HSPA protocol family, for example, HSDPA, EUL (also referred to as HSUPA), and HSPA+. The cellular network 602 also is compatible with 4G mobile communications standards, 5G mobile communications standards, other mobile communications standards, and evolved and future mobile communications standards.

The packet data network 604 includes various devices, for example, servers, computers, databases, and other devices in communication with one another, as is generally known. The packet data network 604 devices are accessible via one or more network links. The servers often store various files that are provided to a requesting device such as, for example, a computer, a terminal, a smartphone, or the like. Typically, the requesting device includes software (a "browser") for executing a web page in a format readable by the browser or other software. Other files and/or data may be accessible via "links" in the retrieved files, as is generally known. In some embodiments, the packet data network 604 includes or is in communication with the Internet. The circuit switched network 606 includes various hardware and software for providing circuit switched communications. The circuit switched network 606 may include, or may be, what is often referred to as a plain old telephone system (POTS). The functionality of a circuit switched network 606 or other circuit-switched network are generally known and will not be described herein in detail.

The illustrated cellular network 602 is shown in communication with the packet data network 604 and a circuit switched network 606, though it should be appreciated that this is not necessarily the case. One or more Internet-capable devices 610, for example, a PC, a laptop, a portable device, or another suitable device, can communicate with one or more cellular networks 602, and devices connected thereto, through the packet data network 604. It also should be appreciated that the Internet-capable device 610 can communicate with the packet data network 604 through the circuit switched network 606, the cellular network 602, and/or via other networks (not illustrated).

As illustrated, a communications device 612, for example, a telephone, facsimile machine, modem, computer, or the like, can be in communication with the circuit switched network 606, and therethrough to the packet data network 604 and/or the cellular network 602. It should be appreciated that the communications device 612 can be an Internet-capable device, and can be substantially similar to the Internet-capable device 610. In the specification, the network 104 is used to refer broadly to any combination of the networks 602, 604, 606. It should be appreciated that substantially all of the functionality described with reference to the network 104 can be performed by the cellular network 602, the packet data network 604, and/or the circuit switched network 606, alone or in combination with other networks, network elements, and the like.

Figure 7:
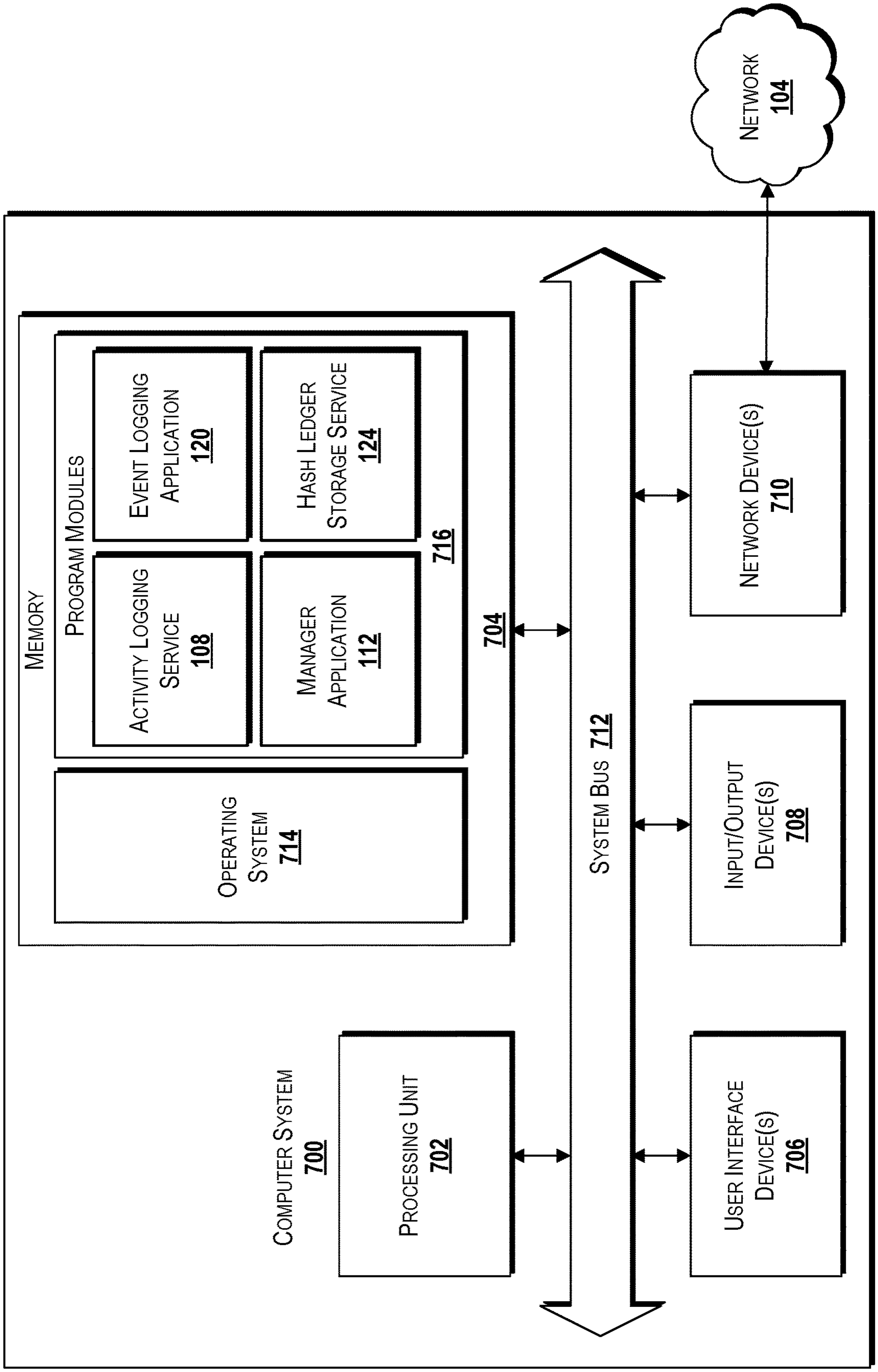
FIG. 7 is a block diagram illustrating an example computer system configured to provide and use an activity logging service, according to some illustrative embodiments of the concepts and technologies described herein.

FIG. 7 is a block diagram illustrating a computer system 700 configured to provide the functionality described herein for providing and using an activity logging service 108, in accordance with various embodiments of the concepts and technologies disclosed herein. The computer system 700 includes a processing unit 702, a memory 704, one or more user interface devices 706, one or more input/output ("I/O") devices 708, and one or more network devices 710, each of which is operatively connected to a system bus 712. The bus 712 enables bi-directional communication between the processing unit 702, the memory 704, the user interface devices 706, the I/O devices 708, and the network devices 710.

The processing unit 702 may be a standard central processor that performs arithmetic and logical operations, a more specific purpose programmable logic controller ("PLC"), a programmable gate array, or other type of processor known to those skilled in the art and suitable for controlling the operation of the server computer. As used herein, the word "processor" and/or the phrase "processing unit" when used with regard to any architecture or system can include multiple processors or processing units distributed across and/or operating in parallel in a single machine or in multiple machines. Furthermore, processors and/or processing units can be used to support virtual processing environments. Processors and processing units also can include state machines, application-specific integrated circuits ("ASICs"), combinations thereof, or the like. Because processors and/or processing units are generally known, the processors and processing units disclosed herein will not be described in further detail herein.

The memory 704 communicates with the processing unit 702 via the system bus 712. In some embodiments, the memory 704 is operatively connected to a memory controller (not shown) that enables communication with the processing unit 702 via the system bus 712. The memory 704 includes an operating system 714 and one or more program modules 716. The operating system 714 can include, but is not limited to, members of the WINDOWS, WINDOWS CE, and/or WINDOWS MOBILE families of operating systems from MICROSOFT CORPORATION, the LINUX family of operating systems, the SYMBIAN family of operating systems from SYMBIAN LIMITED, the BREW family of operating systems from QUALCOMM CORPORATION, the MAC OS, iOS, and/or LEOPARD families of operating systems from APPLE CORPORATION, the FREEBSD family of operating systems, the SOLARIS family of operating systems from ORACLE CORPORATION, other operating systems, and the like.

The program modules 716 may include various software and/or program modules described herein. In some embodiments, for example, the program modules 716 can include the manager application 112, the activity logging service 108, the event logging application 120, and the hash ledger storage service 124. These and/or other programs can be embodied in computer-readable media containing instructions that, when executed by the processing unit 702, perform one or more of the methods 200, 300, and 400 described in detail above with respect to FIGS. 2-4 and/or other functionality as illustrated and described herein. It can be appreciated that, at least by virtue of the instructions embodying the methods 200, 300, 400, and/or other functionality illustrated and described herein being stored in the memory 704 and/or accessed and/or executed by the processing unit 702, the computer system 700 is a special-purpose computing system that can facilitate providing the functionality illustrated and described herein. According to embodiments, the program modules 716 may be embodied in hardware, software, firmware, or any combination thereof. Although not shown in FIG. 7, it should be understood that the memory 704 also can be configured to store the activity logs 110, the event data 116, the hash 122, the hash ledgers 128, and/or other data, if desired.

By way of example, and not limitation, computer-readable media may include any available computer storage media or communication media that can be accessed by the computer system 700. Communication media includes computer-readable instructions, data structures, program modules, or other data in a modulated data signal such as a carrier wave or other transport mechanism and includes any delivery media. The term "modulated data signal" means a signal that has one or more of its characteristics changed or set in a manner as to encode information in the signal. By way of example, and not limitation, communication media includes wired media such as a wired network or direct-wired connection, and wireless media such as acoustic, RF, infrared and other wireless media. Combinations of any of the above should also be included within the scope of computer-readable media.

Computer storage media includes only non-transitory embodiments of computer readable media as illustrated and described herein. Thus, computer storage media can include volatile and non-volatile, removable and non-removable media implemented in any method or technology for storage of information such as computer-readable instructions, data structures, program modules, or other data. Computer storage media includes, but is not limited to, RAM, ROM, Erasable Programmable ROM ("EPROM"), Electrically Erasable Programmable ROM ("EEPROM"), flash memory or other solid state memory technology, CD-ROM, digital versatile disks ("DVD"), or other optical storage, magnetic cassettes, magnetic tape, magnetic disk storage or other magnetic storage devices, or any other medium which can be used to store the desired information and which can be accessed by the computer system 700. In the claims, the phrase "computer storage medium" and variations thereof does not include waves or signals per se and/or communication media.

The user interface devices 706 may include one or more devices with which a user accesses the computer system 700. The user interface devices 706 may include, but are not limited to, computers, servers, personal digital assistants, cellular phones, or any suitable computing devices. The I/O devices 708 enable a user to interface with the program modules 716. In one embodiment, the I/O devices 708 are operatively connected to an I/O controller (not shown) that enables communication with the processing unit 702 via the system bus 712. The I/O devices 708 may include one or more input devices, such as, but not limited to, a keyboard, a mouse, or an electronic stylus. Further, the I/O devices 708 may include one or more output devices, such as, but not limited to, a display screen or a printer.

The network devices 710 enable the computer system 700 to communicate with other networks or remote systems via a network, such as the network 104. Examples of the network devices 710 include, but are not limited to, a modem, a radio frequency ("RF") or infrared ("IR") transceiver, a telephonic interface, a bridge, a router, or a network card. The network 104 may include a wireless network such as, but not limited to, a Wireless Local Area Network ("WLAN") such as a WI-FI network, a Wireless Wide Area Network ("WWAN"), a Wireless Personal Area Network ("WPAN") such as BLUETOOTH, a Wireless Metropolitan Area Network ("WMAN") such as_a WiMAX network, or a cellular network. Alternatively, the network 104 may be a wired network such as, but not limited to, a Wide Area Network ("WAN") such as the Internet, a Local Area Network ("LAN") such as the Ethernet, a wired Personal Area Network ("PAN"), or a wired Metropolitan Area Network ("MAN").

Figure 8:
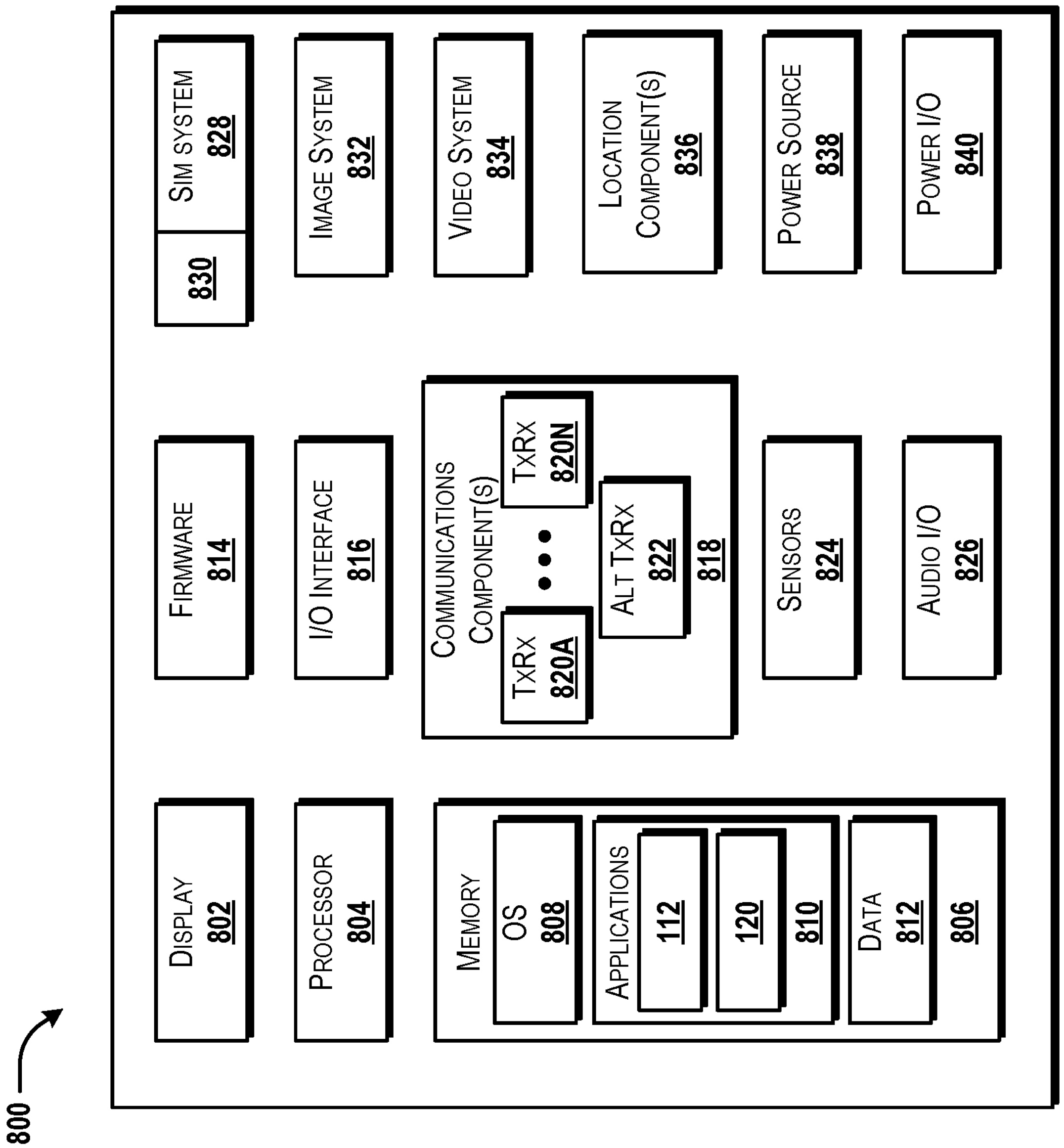
FIG. 8 is a block diagram illustrating an example mobile device configured to interact with an activity logging service, according to some illustrative embodiments of the concepts and technologies described herein.

Turning now to FIG. 8, an illustrative mobile device 800 and components thereof will be described. In some embodiments, the manager device 102, the user device 114, the observer devices 118, and/or the server computer 126 described above with reference to FIGS. 1-5C can be configured as and/or can have an architecture similar or identical to the mobile device 800 described herein in FIG. 8. It should be understood, however, that the manager device 102, the user device 114, the observer devices 118, and/or the server computer 126 may or may not include the functionality described herein with reference to FIG. 8. While connections are not shown between the various components illustrated in FIG. 8, it should be understood that some, none, or all of the components illustrated in FIG. 8 can be configured to interact with one another to carry out various device functions. In some embodiments, the components are arranged so as to communicate via one or more busses (not shown). Thus, it should be understood that FIG. 8 and the following description are intended to provide a general understanding of a suitable environment in which various aspects of embodiments can be implemented, and should not be construed as being limiting in any way.

As illustrated in FIG. 8, the mobile device 800 can include a display 802 for displaying data. According to various embodiments, the display 802 can be configured to display various graphical user interface ("GUI") elements such as, for example, observer devices 118, events, text, images, video, virtual keypads and/or keyboards, messaging data, notification messages, metadata, internet content, device status, time, date, calendar data, device preferences, map and location data, combinations thereof, and/or the like. The mobile device 800 also can include a processor 804 and a memory or other data storage device ("memory") 806. The processor 804 can be configured to process data and/or can execute computer-executable instructions stored in the memory 806. The computer-executable instructions executed by the processor 804 can include, for example, an operating system 808, one or more applications 810 such as the manager application 112, the activity logging service 108, the event logging application 120, and the hash ledger storage service 124, other computer-executable instructions stored in a memory 806, or the like. In some embodiments, the applications 810 also can include a UI application (not illustrated in FIG. 8).

The UI application can interface with the operating system 808, such as the operating system 106 shown in FIG. 1, to facilitate user interaction with functionality and/or data stored at the mobile device 800 and/or stored elsewhere. In some embodiments, the operating system 808 can include a member of the SYMBIAN OS family of operating systems from SYMBIAN LIMITED, a member of the WINDOWS MOBILE OS and/or WINDOWS PHONE OS families of operating systems from MICROSOFT CORPORATION, a member of the PALM WEBOS family of operating systems from HEWLETT PACKARD CORPORATION, a member of the BLACKBERRY OS family of operating systems from RESEARCH IN MOTION LIMITED, a member of the IOS family of operating systems from APPLE INC., a member of the ANDROID OS family of operating systems from GOOGLE INC., and/or other operating systems. These operating systems are merely illustrative of some contemplated operating systems that may be used in accordance with various embodiments of the concepts and technologies described herein and therefore should not be construed as being limiting in any way.

The UI application can be executed by the processor 804 to aid a user in entering content, scanning for observer devices 118, setting preferences for an activity logging service 108, configuring settings, manipulating address book content and/or settings, multimode interaction, interacting with other applications 810, and otherwise facilitating user interaction with the operating system 808, the applications 810, and/or other types or instances of data 812 that can be stored at the mobile device 800. The data 812 can include, for example, the activity logs 110, the event data 116, the hash 122, and/or the hash ledgers 128, and/or other data. According to various embodiments, the data 812 can include, for example, presence applications, visual voice mail applications, messaging applications, text-to-speech and speech-to-text applications, add-ons, plug-ins, email applications, music applications, video applications, camera applications, location-based service applications, power conservation applications, game applications, productivity applications, entertainment applications, enterprise applications, combinations thereof, and the like. The applications 810, the data 812, and/or portions thereof can be stored in the memory 806 and/or in a firmware 814, and can be executed by the processor 804.

It can be appreciated that, at least by virtue of storage of the instructions corresponding to the applications 810 and/or other instructions embodying other functionality illustrated and described herein in the memory 806, and/or by virtue of the instructions corresponding to the applications 810 and/or other instructions embodying other functionality illustrated and described herein being accessed and/or executed by the processor 804, the mobile device 800 is a special-purpose mobile device that can facilitate providing the functionality illustrated and described herein. The firmware 814 also can store code for execution during device power up and power down operations. It can be appreciated that the firmware 814 can be stored in a volatile or non-volatile data storage device including, but not limited to, the memory 806 and/or a portion thereof.

The mobile device 800 also can include an input/output ("I/O") interface 816. The I/O interface 816 can be configured to support the input/output of data such as location information, user information, organization information, presence status information, user IDs, passwords, and application initiation (start-up) requests. In some embodiments, the I/O interface 816 can include a hardwire connection such as a universal serial bus ("USB") port, a mini-USB port, a micro-USB port, an audio jack, a PS2 port, an IEEE 1394 ("FIREWIRE") port, a serial port, a parallel port, an Ethernet (RJ45 or RJ48) port, a telephone (RJ11 or the like) port, a proprietary port, combinations thereof, or the like. In some embodiments, the mobile device 800 can be configured to synchronize with another device to transfer content to and/or from the mobile device 800. In some embodiments, the mobile device 800 can be configured to receive updates to one or more of the applications 810 via the I/O interface 816, though this is not necessarily the case. In some embodiments, the I/O interface 816 accepts I/O devices such as keyboards, keypads, mice, interface tethers, printers, plotters, external storage, touch/multi-touch screens, touch pads, trackballs, joysticks, microphones, remote control devices, displays, projectors, medical equipment (e.g., stethoscopes, heart monitors, and other health metric monitors), modems, routers, external power sources, docking stations, combinations thereof, and the like. It should be appreciated that the I/O interface 816 may be used for communications between the mobile device 800 and a network device or local device.

The mobile device 800 also can include a communications component 818. The communications component 818 can be configured to interface with the processor 804 to facilitate wired and/or wireless communications with one or more networks such as the network 104 described herein. In some embodiments, other networks include networks that utilize non-cellular wireless technologies such as WI-FI or WIMAX. In some embodiments, the communications component 818 includes a multimode communications subsystem for facilitating communications via the cellular network and one or more other networks.

The communications component 818, in some embodiments, includes one or more transceivers. The one or more transceivers, if included, can be configured to communicate over the same and/or different wireless technology standards with respect to one another. For example, in some embodiments one or more of the transceivers of the communications component 818 may be configured to communicate using GSM, CDMAONE, CDMA2000, LTE, and various other 2G, 2.5G, 3G, 4G, 5G, and greater generation technology standards. Moreover, the communications component 818 may facilitate communications over various channel access methods (which may or may not be used by the aforementioned standards) including, but not limited to, TDMA, FDMA, W-CDMA, OFDM, SDMA, and the like.

In addition, the communications component 818 may facilitate data communications using GPRS, EDGE, the HSPA protocol family including HSDPA, EUL or otherwise termed HSDPA, HSPA+, and various other current and future wireless data access standards. In the illustrated embodiment, the communications component 818 can include a first transceiver ("TxRx") 820A that can operate in a first communications mode (e.g., GSM). The communications component 818 also can include an $N^{th}$ transceiver ("TxRx") 820N that can operate in a second communications mode relative to the first transceiver 820A (e.g., UMTS). While two transceivers 820A-N (hereinafter collectively and/or generically referred to as "transceivers 820") are shown in FIG. 8, it should be appreciated that less than two, two, and/or more than two transceivers 820 can be included in the communications component 818.

The communications component 818 also can include an alternative transceiver ("Alt TxRx") 822 for supporting other types and/or standards of communications. According to various contemplated embodiments, the alternative transceiver 822 can communicate using various communications technologies such as, for example, WI-FI, WIMAX, BLUETOOTH, infrared, infrared data association ("IRDA"), near field communications ("NFC"), other RF technologies, combinations thereof, and the like. In some embodiments, the communications component 818 also can facilitate reception from terrestrial radio networks, digital satellite radio networks, internet-based radio service networks, combinations thereof, and the like. The communications component 818 can process data from a network such as the Internet, an intranet, a broadband network, a WI-FI hotspot, an Internet service provider ("ISP"), a digital subscriber line ("DSL") provider, a broadband provider, combinations thereof, or the like.

The mobile device 800 also can include one or more sensors 824. The sensors 824 can include temperature sensors, light sensors, air quality sensors, movement sensors, orientation sensors, noise sensors, proximity sensors, or the like. As such, it should be understood that the sensors 824 can include, but are not limited to, accelerometers, magnetometers, gyroscopes, infrared sensors, noise sensors, microphones, combinations thereof, or the like. Additionally, audio capabilities for the mobile device 800 may be provided by an audio I/O component 826. The audio I/O component 826 of the mobile device 800 can include one or more speakers for the output of audio signals, one or more microphones for the collection and/or input of audio signals, and/or other audio input and/or output devices.

The illustrated mobile device 800 also can include a subscriber identity module ("SIM") system 828. The SIM system 828 can include a universal SIM ("USIM"), a universal integrated circuit card ("UICC") and/or other identity devices. The SIM system 828 can include and/or can be connected to or inserted into an interface such as a slot interface 830. In some embodiments, the slot interface 830 can be configured to accept insertion of other identity cards or modules for accessing various types of networks. Additionally, or alternatively, the slot interface 830 can be configured to accept multiple subscriber identity cards. Because other devices and/or modules for identifying users and/or the mobile device 800 are contemplated, it should be understood that these embodiments are illustrative, and should not be construed as being limiting in any way.

The mobile device 800 also can include an image capture and processing system ("image system") 832. The image system 832 can be configured to capture or otherwise obtain photos, videos, and/or other visual information. As such, the image system 832 can include cameras, lenses, charge-coupled devices ("CCDs"), combinations thereof, or the like. The mobile device 800 may also include a video system 834. The video system 834 can be configured to capture, process, record, modify, and/or store video content. Photos and videos obtained using the image system 832 and the video system 834, respectively, may be added as message content to an MMS message, email message, and sent to another mobile device. The video and/or photo content also can be shared with other devices via various types of data transfers via wired and/or wireless communication devices as described herein.

The mobile device 800 also can include one or more location components 836. The location components 836 can be configured to send and/or receive signals to determine a geographic location of the mobile device 800. According to various embodiments, the location components 836 can send and/or receive signals from global positioning system ("GPS") devices, assisted-GPS ("A-GPS") devices, WI-FUWIMAX and/or cellular network triangulation data, combinations thereof, and the like. The location component 836 also can be configured to communicate with the communications component 818 to retrieve triangulation data for determining a location of the mobile device 800. In some embodiments, the location component 836 can interface with cellular network nodes, telephone lines, satellites, location transmitters and/or beacons, wireless network transmitters and receivers, combinations thereof, and the like. In some embodiments, the location component 836 can include and/or can communicate with one or more of the sensors 824 such as a compass, an accelerometer, and/or a gyroscope to determine the orientation of the mobile device 800. Using the location component 836, the mobile device 800 can generate and/or receive data to identify its geographic location, or to transmit data used by other devices to determine the location of the mobile device 800. The location component 836 may include multiple components for determining the location and/or orientation of the mobile device 800.

The illustrated mobile device 800 also can include a power source 838. The power source 838 can include one or more batteries, power supplies, power cells, and/or other power subsystems including alternating current ("AC") and/or direct current ("DC") power devices. The power source 838 also can interface with an external power system or charging equipment via a power I/O component 840. Because the mobile device 800 can include additional and/or alternative components, the above embodiment should be understood as being illustrative of one possible operating environment for various embodiments of the concepts and technologies described herein. The described embodiment of the mobile device 800 is illustrative, and should not be construed as being limiting in any way.

Figure 9:
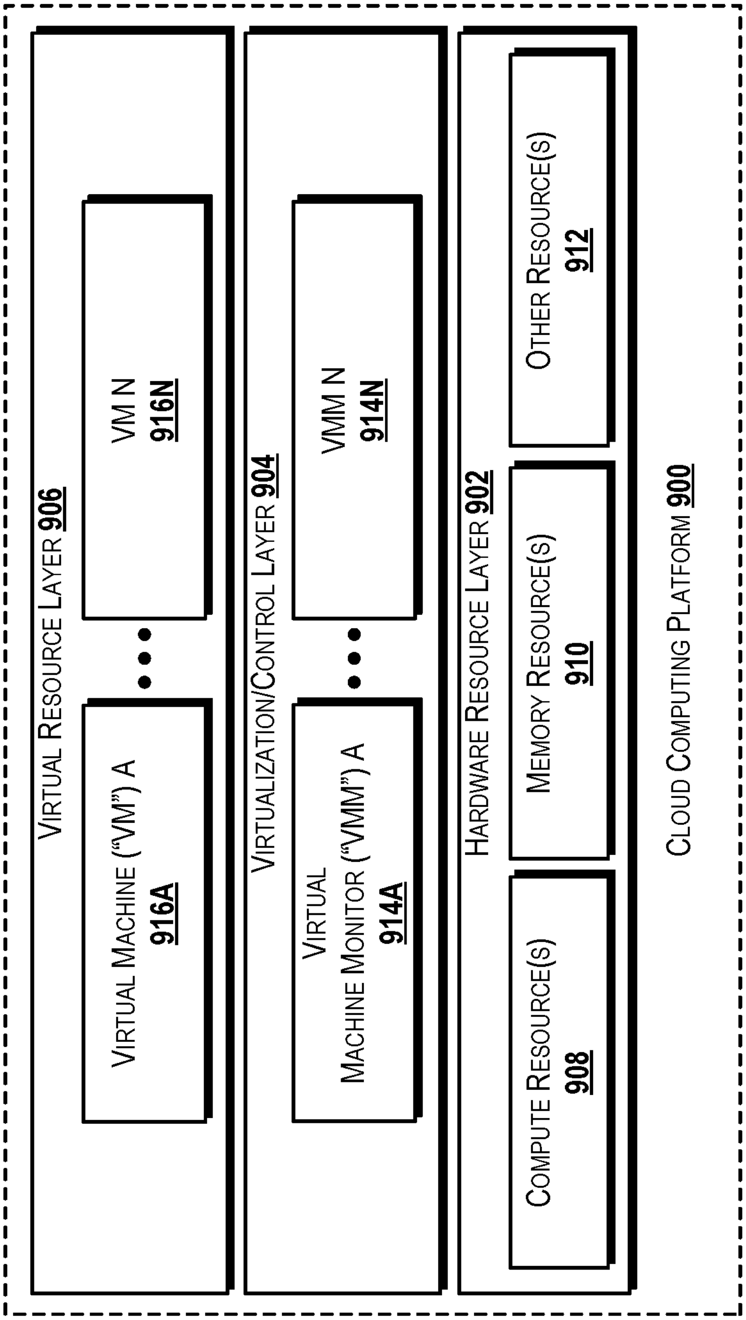
FIG. 9 is a diagram illustrating a computing environment capable of implementing aspects of the concepts and technologies disclosed herein, according to some illustrative embodiments of the concepts and technologies described herein.

FIG. 9 illustrates an illustrative architecture for a cloud computing platform 900 that can be capable of executing the software components described herein for providing and using an activity logging service and/or for interacting with the activity logging service 108. Thus, it can be appreciated that in some embodiments of the concepts and technologies disclosed herein, the cloud computing platform 900 illustrated in FIG. 9 can be used to provide the functionality described herein with respect to the manager device 102, the user device 114, the observer devices 118, and/or the server computer 126.

The cloud computing platform 900 thus may be utilized to execute any aspects of the software components presented herein. Thus, according to various embodiments of the concepts and technologies disclosed herein, the manager application 112, the activity logging service 108, the event logging application 120, and/or the hash ledger storage service 124 can be implemented, at least in part, on or by elements included in the cloud computing platform 900 illustrated and described herein. Those skilled in the art will appreciate that the illustrated cloud computing platform 900 is a simplification of but only one possible implementation of an illustrative cloud computing platform, and as such, the illustrated cloud computing platform 900 should not be construed as being limiting in any way.

In the illustrated embodiment, the cloud computing platform 900 can include a hardware resource layer 902, a virtualization/control layer 904, and a virtual resource layer 906. These layers and/or other layers can be configured to cooperate with each other and/or other elements of a cloud computing platform 900 to perform operations as will be described in detail herein. While connections are shown between some of the components illustrated in FIG. 9, it should be understood that some, none, or all of the components illustrated in FIG. 9 can be configured to interact with one another to carry out various functions described herein. In some embodiments, the components are arranged so as to communicate via one or more networks such as, for example, the network 104 illustrated and described hereinabove (not shown in FIG. 9). Thus, it should be understood that FIG. 9 and the following description are intended to provide a general understanding of a suitable environment in which various aspects of embodiments can be implemented, and should not be construed as being limiting in any way.

The hardware resource layer 902 can provide hardware resources. In the illustrated embodiment, the hardware resources can include one or more compute resources 908, one or more memory resources 910, and one or more other resources 912. The compute resource(s) 908 can include one or more hardware components that can perform computations to process data, and/or to execute computer-executable instructions of one or more application programs, operating systems, services, and/or other software including, but not limited to, the operating system 106, the manager application 112, the activity logging service 108, the event logging application 120, and/or the hash ledger storage service 124, illustrated and described herein.

According to various embodiments, the compute resources 908 can include one or more central processing units ("CPUs"). The CPUs can be configured with one or more processing cores. In some embodiments, the compute resources 908 can include one or more graphics processing units ("GPUs"). The GPUs can be configured to accelerate operations performed by one or more CPUs, and/or to perform computations to process data, and/or to execute computer-executable instructions of one or more application programs, operating systems, and/or other software that may or may not include instructions that are specifically graphics computations and/or related to graphics computations. In some embodiments, the compute resources 908 can include one or more discrete GPUs. In some other embodiments, the compute resources 908 can include one or more CPU and/or GPU components that can be configured in accordance with a co-processing CPU/GPU computing model. Thus, it can be appreciated that in some embodiments of the compute resources 908, a sequential part of an application can execute on a CPU and a computationally-intensive part of the application can be accelerated by the GPU. It should be understood that this example is illustrative, and therefore should not be construed as being limiting in any way.

In some embodiments, the compute resources 908 also can include one or more system on a chip ("SoC") components. It should be understood that an SoC component can operate in association with one or more other components as illustrated and described herein, for example, one or more of the memory resources 910 and/or one or more of the other resources 912. In some embodiments in which an SoC component is included, the compute resources 908 can be or can include one or more embodiments of the SNAPDRAGON brand family of SoCs, available from QUALCOMM of San Diego, California; one or more embodiment of the TEGRA brand family of SoCs, available from NVIDIA of Santa Clara, California; one or more embodiment of the HUMMINGBIRD brand family of SoCs, available from SAMSUNG of Seoul, South Korea; one or more embodiment of the Open Multimedia Application Platform ("OMAP") family of SoCs, available from TEXAS INSTRUMENTS of Dallas, Texas; one or more customized versions of any of the above SoCs; and/or one or more other brand and/or one or more proprietary SoCs.

The compute resources 908 can be or can include one or more hardware components arranged in accordance with an ARM architecture, available for license from ARM HOLDINGS of Cambridge, United Kingdom. Alternatively, the compute resources 908 can be or can include one or more hardware components arranged in accordance with an x86 architecture, such as an architecture available from INTEL CORPORATION of Mountain View, California, and others. Those skilled in the art will appreciate the implementation of the compute resources 908 can utilize various computation architectures and/or processing architectures. As such, the various example embodiments of the compute resources 908 as mentioned hereinabove should not be construed as being limiting in any way. Rather, implementations of embodiments of the concepts and technologies disclosed herein can be implemented using compute resources 908 having any of the particular computation architecture and/or combination of computation architectures mentioned herein as well as other architectures.

Although not separately illustrated in FIG. 9, it should be understood that the compute resources 908 illustrated and described herein can host and/or execute various services, applications, portals, and/or other functionality illustrated and described herein. Thus, the compute resources 908 can host and/or can execute the manager application 112, the activity logging service 108, the event logging application 120, the hash ledger storage service 124, and/or other applications or services illustrated and described herein.

The memory resource(s) 910 can include one or more hardware components that can perform or provide storage operations, including temporary and/or permanent storage operations. In some embodiments, the memory resource(s) 910 can include volatile and/or non-volatile memory implemented in any method or technology for storage of information such as computer-readable instructions, data structures, program modules, or other data disclosed herein. Computer storage media is defined hereinabove and therefore should be understood as including, in various embodiments, random access memory ("RAM"), read-only memory ("ROM"), Erasable Programmable ROM ("EPROM"), Electrically Erasable Programmable ROM ("EEPROM"), flash memory or other solid state memory technology, CD-ROM, digital versatile disks ("DVD"), or other optical storage, magnetic cassettes, magnetic tape, magnetic disk storage or other magnetic storage devices, or any other medium that can be used to store data and that can be accessed by the compute resources 908, subject to the definition of "computer storage media" provided above (e.g., as excluding waves and signals per se and/or communication media as defined in this application).

Although not illustrated in FIG. 9, it should be understood that the memory resources 910 can host or store the various data illustrated and described herein including, but not limited to, the activity logs 110, the event data 116, the hashes 122, the hash ledgers 128, and/or other data, if desired. It should be understood that this example is illustrative, and therefore should not be construed as being limiting in any way.

The other resource(s) 912 can include any other hardware resources that can be utilized by the compute resources(s) 908 and/or the memory resource(s) 910 to perform operations. The other resource(s) 912 can include one or more input and/or output processors (e.g., a network interface controller and/or a wireless radio), one or more modems, one or more codec chipsets, one or more pipeline processors, one or more fast Fourier transform ("FFT") processors, one or more digital signal processors ("DSPs"), one or more speech synthesizers, combinations thereof, or the like.

The hardware resources operating within the hardware resource layer 902 can be virtualized by one or more virtual machine monitors ("VMMs") 914A-914N (also known as "hypervisors;" hereinafter "VMMs 914"). The VMMs 914 can operate within the virtualization/control layer 904 to manage one or more virtual resources that can reside in the virtual resource layer 906. The VMMs 914 can be or can include software, firmware, and/or hardware that alone or in combination with other software, firmware, and/or hardware, can manage one or more virtual resources operating within the virtual resource layer 906.

The virtual resources operating within the virtual resource layer 906 can include abstractions of at least a portion of the compute resources 908, the memory resources 910, the other resources 912, or any combination thereof. These abstractions are referred to herein as virtual machines ("VMs"). In the illustrated embodiment, the virtual resource layer 906 includes VMs 916A-916N (hereinafter "VMs 916").

Based on the foregoing, it should be appreciated that systems and methods for providing and using an activity logging service have been disclosed herein. Although the subject matter presented herein has been described in language specific to computer structural features, methodological and transformative acts, specific computing machinery, and computer-readable media, it is to be understood that the concepts and technologies disclosed herein are not necessarily limited to the specific features, acts, or media described herein. Rather, the specific features, acts and mediums are disclosed as example forms of implementing the concepts and technologies disclosed herein.

The subject matter described above is provided by way of illustration only and should not be construed as limiting. Various modifications and changes may be made to the subject matter described herein without following the example embodiments and applications illustrated and described, and without departing from the true spirit and scope of the embodiments of the concepts and technologies disclosed herein.

The invention claimed is:

1. A system comprising a processor and a memory that stores computer-executable instructions that, when executed by the processor, cause the processor to perform operations comprising:

linking, by an activity logging service hosted on a manager device comprising a gateway device, the activity logging service with a hash ledger storage service that is hosted by a server computer that operates on a network, wherein the manager device communicates with the server computer via the network, wherein the activity logging service is configured to collect event data from an observer device that communicates with the manager device, to generate an activity log based on the event data, and to send a hash of the activity log to the hash ledger storage service, wherein the hash ledger storage service is configured to store a hash ledger that comprises a hashed version of the activity log, wherein the activity log represents events that are associated with a user device that is associated with an entity and that were observed by the observer device;

detecting, by the manager device, a request to search an area around the manager device and the user device for observer devices that are capable of detecting the events that are associated with the user device, the observer devices comprising the observer device and the events comprising an event, wherein the request to search the area is created at the user device, and wherein the observer device comprises a camera, and wherein the camera observes activity of the user device to capture the event;

in response to detecting the request, scanning, by the manager device, the area around the manager device and the user device for the observer devices, wherein results of the scanning are presented in an observer device registration window presented at the user device, and wherein the observer device registration window comprises an option to use the observer device to detect the event;

in response to detecting selection of the option to use the observer device to detect the event, linking and configuring, by the manager device, the observer device with the activity logging service, wherein the manager device configures the observer device to detect the event, to determine an identity associated with the event based on a device identifier associated with the user device, to generate the event data, and to provide the event data to the activity logging service via the network, wherein the event data describes the event;

generating, by the manager device and based on event data that the manager device obtains from the observer device, a block that represents the event, wherein the block comprises first data that represents the identity, second data that describes the event, and third data that defines a time the observer device observed the event;

adding, by the manager device, the block to the activity log that represents activities associated with the entity, wherein the activity log comprises a previous block that represents a previous event associated with the user device;

hashing, by the manager device, a portion of the activity log that comprises the block and the previous block to generate the hash; and sending, by the manager device and to the server computer via the network, the hash to the hash ledger storage service, wherein the hash ledger storage service appends the hash of the portion of the activity log to the hash ledger that comprises the hashed version of the activity log for the entity to create an updated hash ledger comprising an updated hashed version of the activity log, and wherein the hash ledger service stores the hash ledger as a blockchain data structure that is stored at the server computer, whereby the activity log cannot be modified without detection.

2. The system of claim 1, wherein the computer-executable instructions, when executed by the processor, cause the processor to perform operations further comprising:

initiating event logging via an interaction with the user device, wherein the interaction occurs via a portal that is provided by the activity logging service and that is accessed by the user device via the network.

3. The system of claim 1, wherein the portion of the activity log further comprises metadata that defines the time and a location associated with the block, wherein the location associated with the block comprises a location at which the event occurred, and wherein the metadata is generated by the observer device.

4. The system of claim 1, wherein the user device scans the area around the user device for the observer devices in response to detecting the request at the user device.

5. The system of claim 1, wherein the computer-executable instructions, when executed by the processor, cause the processor to perform operations further comprising:

obtaining, from the user device, preferences for logging the events using the observer device, wherein the preferences are obtained by the user device via an activity logging service preferences window that is presented at the user device, and wherein the activity logging service preferences window comprises a plurality of controls for enabling and disabling logging of the events for activities performed at the user device.

6. The system of claim 1, wherein the activity log comprises a circular buffer that represents the events over a sliding window of time, and wherein an oldest block is removed from the activity log when a block time associated with the oldest block is no longer encompassed by the sliding window of time.

7. A method comprising:

linking, by an activity logging service hosted on a manager device comprising a gateway device, the activity logging service with a hash ledger storage service that is hosted by a server computer that operates on a network, wherein the manager device communicates with the server computer via the network, wherein the activity logging service is configured to collect event data from an observer device that communicates with the manager device, to generate an activity log based on the event data, and to send a hash of the activity log to the hash ledger storage service, wherein the hash ledger storage service is configured to store a hash ledger that comprises a hashed version of the activity log, wherein the activity log represents events that are associated with a user device that is associated with an entity and that were observed by the observer device;

detecting, by the manager device, a request to search an area around the manager device and the user device for observer devices that are capable of detecting the events that are associated with the user device, the observer devices comprising the observer device and the events comprising an event, wherein the request to search the area is created at the user device, and wherein the observer device comprises a camera, and wherein the camera observes activity of the user device to capture the event;

in response to detecting the request, scanning, by the manager device, the area around the manager device and the user device for the observer devices, wherein results of the scanning are presented in an observer device registration window presented at the user device, and wherein the observer device registration window comprises an option to use the observer device to detect the event;

in response to detecting selection of the option to use the observer device to detect the event, linking and configuring, by the manager device, the observer device with the activity logging service, wherein the manager device configures the observer device to detect the event, to determine an identity associated with the event based on a device identifier associated with the user device, to generate the event data, and to provide the event data to the activity logging service via the network, wherein the event data describes the event;

generating, by the manager device and based on event data that the manager device obtains from the observer device, a block that represents the event, wherein the block comprises first data that represents the identity, second data that describes the event, and third data that defines a time the observer device observed the event;

adding, by the manager device, the block to the activity log that represents activities associated with the entity, wherein the activity log comprises a previous block that represents a previous event associated with the user device;

hashing, by the manager device, a portion of the activity log that comprises the block and the previous block to generate the hash; and sending, by the manager device and to the server computer via the network, the hash to the hash ledger storage service, wherein the hash ledger storage service appends the hash of the portion of the activity log to the hash ledger that comprises the hashed version of the activity log for the entity to create an updated hash ledger comprising an updated hashed version of the activity log, and wherein the hash ledger service stores the hash ledger as a blockchain data structure that is stored at the server computer, whereby the activity log cannot be modified without detection.

8. The method of claim 7, further comprising:

initiating event logging via an interaction with the user device, wherein the interaction occurs via portal that is provided by the activity logging service and that is accessed by the user device via the network.

9. The method of claim 7, further comprising:

obtaining, by the manager device and from the user device, preferences for logging the events using the observer device, wherein the preferences are obtained by the user device via an activity logging service preferences window that is presented at the user device, and wherein the activity logging service preferences window comprises a plurality of controls for enabling and disabling logging of the events for activities performed at the user device.

10. The method of claim 7, further comprising obtaining, from the user device, settings that specify which of the events the activity logging service is to log, wherein the settings are obtained from the user device via the network, and wherein the settings are obtained by the user device via a user interface presented at the user device.

11. The method of claim 7, wherein the event comprises a change in state associated with the entity, and wherein the camera captures the change in state.

12. The method of claim 7, wherein the event comprises a movement of the entity in proximity to the observer device.

13. The method of claim 7, wherein the user device scans the area around the user device for the observer devices in response to detecting the request at the user device.

14. A computer storage medium having computer-executable instructions stored thereon that, when executed by a processor, cause the processor to perform operations comprising: linking, by an activity logging service hosted on a manager device comprising a gateway device, the activity logging service with a hash ledger storage service that is hosted by a server computer that operates on a network, wherein the manager device communicates with the server computer via the network, wherein the activity logging service is configured to collect event data from an observer device that communicates with the manager device, to generate an activity log based on the event data, and to send a hash of the activity log to the hash ledger storage service, wherein the hash ledger storage service is configured to store a hash ledger that comprises a hashed version of the activity log, wherein the activity log represents events that are associated with a user device that is associated with an entity and that were observed by the observer device;

detecting, by the manager device, a request to search an area around the manager device and the user device for observer devices that are capable of detecting the events that are associated with the user device, the observer devices comprising the observer device and the events comprising an event, wherein the request to search the area is created at the user device, and wherein the observer device comprises a camera, and wherein the camera observes activity of the user device to capture the event;

in response to detecting the request, scanning, by the manager device, the area around the manager device and the user device for the observer devices, wherein results of the scanning are presented in an observer device registration window presented at the user device, and wherein the observer device registration window comprises an option to use the observer device to detect the event;

in response to detecting selection of the option to use the observer device to detect the event, linking and configuring, by the manager device, the observer device with the activity logging service, wherein the manager device configures the observer device to detect the event, to determine an identity associated with the event based on a device identifier associated with the user device, to generate the event data, and to provide the event data to the activity logging service via the network, wherein the event data describes the event;

generating, by the manager device and based on event data that the manager device obtains from the observer device, a block that represents the event, wherein the block comprises first data that represents the identity, second data that describes the event, and third data that defines a time the observer device observed the event;

adding, by the manager device, the block to the activity log that represents activities associated with the entity, wherein the activity log comprises a previous block that represents a previous event associated with the user device;

hashing, by the manager device, a portion of the activity log that comprises the block and the previous block to generate the hash; and sending, by the manager device and to the server computer via the network, the hash to the hash ledger storage service, wherein the hash ledger storage service appends the hash of the portion of the activity log to the hash ledger that comprises the hashed version of the activity log for the entity to create an updated hash ledger comprising an updated hashed version of the activity log, and wherein the hash ledger service stores the hash ledger as a blockchain data structure that is stored at the server computer, whereby the activity log cannot be modified without detection.

15. The computer storage medium of claim 14, wherein the computer-executable instructions, when executed by the processor, cause the processor to perform operations further comprising:

initiating event logging via an interaction with the user device, wherein the interaction occurs via a portal that is provided by the activity logging service and that is accessed by the user device via the network.

16. The computer storage medium of claim 14, wherein the computer-executable instructions, when executed by the processor, cause the processor to perform operations further comprising:

obtaining, from the user device, preferences for logging the events using the observer device, wherein the preferences are obtained by the user device via an activity logging service preferences window that is presented at the user device, and wherein the activity logging service preferences window comprises a plurality of controls for enabling and disabling logging of the events for activities performed at the user device.

17. The computer storage medium of claim 14, wherein the computer-executable instructions, when executed by the processor, cause the processor to perform operations further comprising:

obtaining, from the user device, settings that specify which of the events the activity logging service is to log, wherein the settings are obtained from the user device via the network, and wherein the settings are obtained by the user device via a user interface presented at the user device.

18. The computer storage medium of claim 14, wherein the event comprises a change in state associated with the entity, and wherein the camera captures the change in state.

19. The computer storage medium of claim 14, wherein the event comprises a movement of the entity in proximity to the observer device.

20. The computer storage medium of claim 14, wherein the user device scans the area around the user device for the observer devices in response to detecting the request at the user device.

* * * * *